United States Patent
Cole et al.

(10) Patent No.: US 10,397,543 B2
(45) Date of Patent: Aug. 27, 2019

(54) METHODS AND APPARATUS FOR CAPTURING, STREAMING AND/OR PLAYING BACK CONTENT

(71) Applicant: NextVR Inc., Newport Beach, CA (US)

(72) Inventors: David Cole, Laguna Beach, CA (US); Alan McKay Moss, Laguna Beach, CA (US); Hector M Medina, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 193 days.

(21) Appl. No.: 14/845,202

(22) Filed: Sep. 3, 2015

(65) Prior Publication Data
US 2016/0065946 A1 Mar. 3, 2016

Related U.S. Application Data

(60) Provisional application No. 62/045,004, filed on Sep. 3, 2014.

(51) Int. Cl.
*H04N 7/12* (2006.01)
*H04N 11/02* (2006.01)
(Continued)

(52) U.S. Cl.
CPC ......... *H04N 13/172* (2018.05); *H04N 13/117* (2018.05); *H04N 13/139* (2018.05);
(Continued)

(58) Field of Classification Search
None
See application file for complete search history.

(56) References Cited

U.S. PATENT DOCUMENTS 6,788,333 B1 9/2004 Uyttendaele et al.
7,307,655 B1 12/2007 Okamoto et al.
(Continued)

FOREIGN PATENT DOCUMENTS

WO 2006062325 A1 6/2006

OTHER PUBLICATIONS

Notification of Transmittal of the International Search Report and the Written Opinion of the International Searching Authority, International Search Report and Written Opinion of the International Searching Authority from PCT/US2015/048439 dated Dec. 24, 2015, 7 pages.
(Continued)

*Primary Examiner* — Rebecca A Volentine
(74) *Attorney, Agent, or Firm* — Straub & Straub; Michael P. Straub; Stephen T. Straub

(57) ABSTRACT

Methods and apparatus for streaming or playing back stereoscopic content are described. Camera dependent correction information is communicated to a playback device and applied in the playback device to compensate for distortions introduced by the lenses of individual cameras. By performing lens dependent distortion compensation in the playback device edges which might be lost if correction were performed prior to encoding are preserved. Distortion correction information maybe in the form of UV map correction information. The correction information may indicate changes to be made to information in a UV map, e.g., at rendering time, to compensate for distortions specific to an individual camera. Different sets of correction information maybe communicated and used for different cameras of a stereoscopic pair which provide images that are rendered using the same UV map. The communicated correction information is sometimes called a correction mesh since it is used to correct mesh related information.

20 Claims, 25 Drawing Sheets

(51) Int. Cl.
*H04N 11/04* (2006.01)
*H04N 13/00* (2018.01)
*H04N 13/172* (2018.01)
*H04N 13/161* (2018.01)
*H04N 13/189* (2018.01)
*H04N 13/194* (2018.01)
*H04N 19/597* (2014.01)
*H04N 13/275* (2018.01)
*H04N 13/117* (2018.01)
*H04N 13/366* (2018.01)
*H04N 13/139* (2018.01)
*H04N 13/398* (2018.01)
*H04N 13/239* (2018.01)
*H04N 13/246* (2018.01)
*H04N 13/344* (2018.01)

(52) U.S. Cl.
CPC ......... *H04N 13/161* (2018.05); *H04N 13/189* (2018.05); *H04N 13/194* (2018.05); *H04N 13/239* (2018.05); *H04N 13/275* (2018.05); *H04N 13/366* (2018.05); *H04N 13/398* (2018.05); *H04N 19/597* (2014.11); *H04N 13/246* (2018.05); *H04N 13/344* (2018.05)

(56) References Cited

U.S. PATENT DOCUMENTS

| | | |
|---|---|---|
| 2005/0185711 A1 | 8/2005 | Pfister et al. |
| 2012/0154519 A1 | 6/2012 | Zargarpour et al. |
| 2012/0182403 A1 | 7/2012 | Lange |
| 2012/0229604 A1* | 9/2012 | Boyce ............... H04N 19/597 348/43 |
| 2013/0128992 A1* | 5/2013 | Swaminathan ...... H04N 19/597 375/240.26 |
| 2013/0257857 A1* | 10/2013 | Kakizawa ........... G06F 3/04815 345/419 |
| 2014/0176535 A1 | 6/2014 | Krig |

OTHER PUBLICATIONS

Pintaric, Thomas & Newumann, Ulrich & Rizzo, Albert, Immersive Panoramic Video Published on Mar. 2002, https://www.researchgate.net/publication/2519331, DOI 10.1145/354384.376408.

Supplementary European Search Report with the Annex to the European Search Report on European Patent Application No. EP15837993 and the European Search Opinion dated Mar. 6, 2018, pp. 1-13.

* cited by examiner

ASSEMBLED MESH

1900 CORRECTION MESH APPLICATION

2000 DISTORTION CORRECTED IMAGES

| FIGURE 23A |
|---|
| FIGURE 23B |

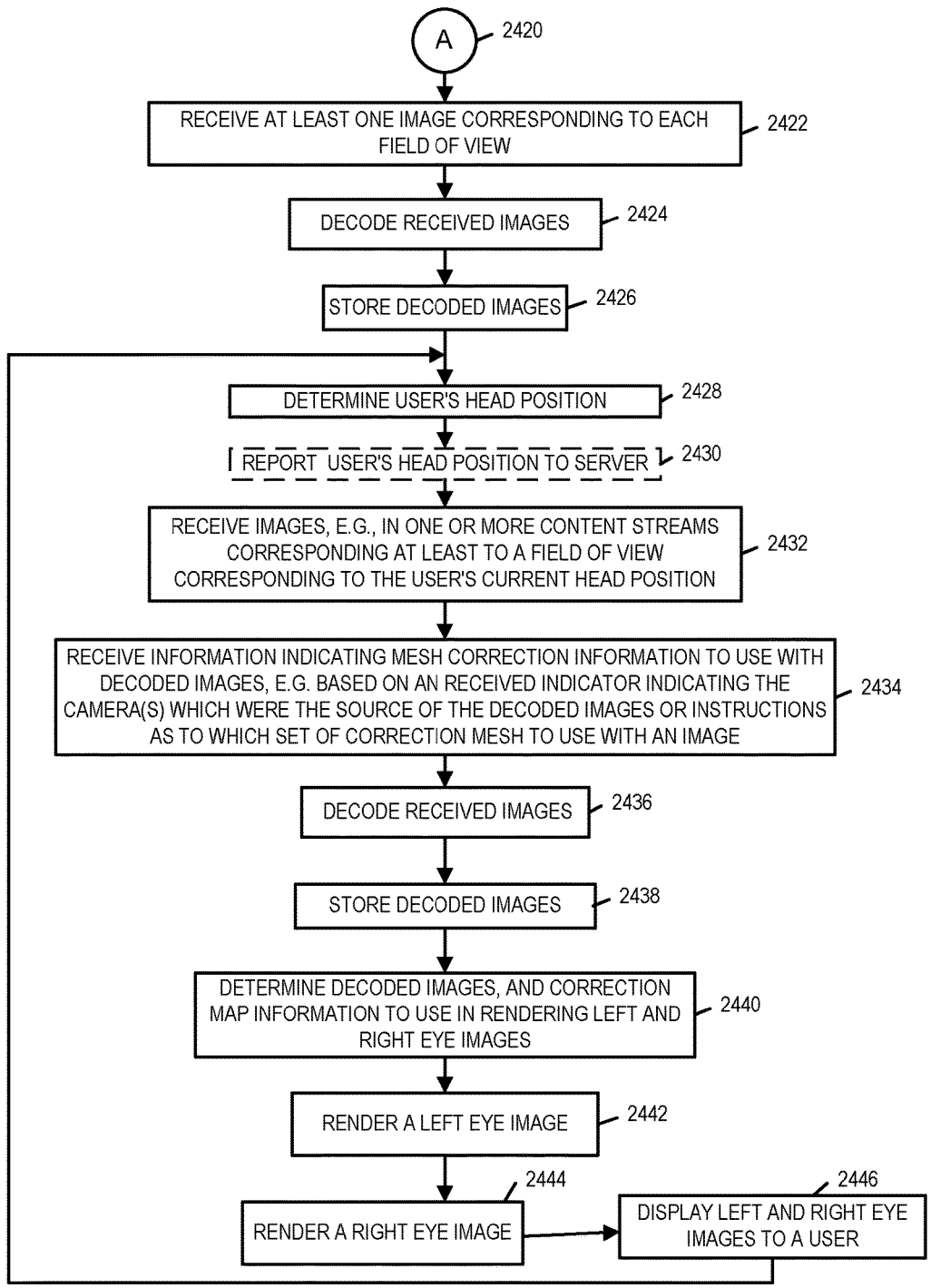

METHODS AND APPARATUS FOR CAPTURING, STREAMING AND/OR PLAYING BACK CONTENT

RELATED APPLICATIONS

The present application claims the benefit of U. S. Provisional Patent Application Ser. No. 62/045,004 filed Sep. 3, 2014 which is hereby expressly incorporated by reference in its entirety and in addition U. S. Provisional Patent Application Ser. No. 61/947,312 filed Mar. 3, 2014 and U. S. Provisional Patent Application Ser. No. 62/004,547 filed May 29, 2014 are each hereby expressly incorporated by reference in their entirety.

FIELD

The present invention relates to methods and apparatus for capturing, streaming and/or playback of content, e.g., content which can be used to simulate a 3D environment.

BACKGROUND

Display devices which are intended to provide an immersive experience normally allow a user to turn his head and experience a corresponding change in the scene which is displayed. Head mounted displays sometimes support 360 degree viewing in that a user can turn around while wearing a head mounted display with the scene being displayed changing as the user's head position is changes.

With such devices a user should be presented with a scene that was captured in front of a camera position when looking forward and a scene that was captured behind the camera position when the user turns completely around. While a user may turn his head to the rear, at any given time a user's field of view is normally limited to 120 degrees or less due to the nature of a human's ability to perceive a limited field of view at any given time.

In order to support 360 degrees of view, a 360 degree scene may be captured using multiple cameras with the images being combined to generate the 360 degree scene which is to be made available for viewing.

It should be appreciated that a 360 degree view includes a lot more image data than a simple forward view which is normally captured, encoded for normal television and many other video applications where a user does not have the opportunity to change the viewing angle used to determine the image to be displayed at a particular point in time.

Given transmission the constraints, e.g., network data constraints, associated with content being streamed, it may not be possible to stream the full 360 degree view in full high definition video to all customers seeking to receive and interact with the content. This is particularly the case where the content is stereoscopic content including image content intended to correspond to left and right eye views to allow for a 3D viewing effect.

In the case of stereoscopic camera rigs, wide angle lenses, e.g., fisheye camera lenses, may be used to capture a wide viewing area. While the general lens geometry may be known, manufacturing differences can result in different lenses having different optical characteristics. For example, two fish eye lenses produced in a single batch of lenses may have different optical defects. In the case of stereoscopic image capture, separate left and right eye views are normally captured using separate cameras of a camera pair. Since the lenses will differ on each of the cameras used to capture the left and right eye images, the differences in the camera optics will result in differences in the captured images of a scene area beyond those expected from the camera spacing between the left and right eye images. Such differences can result in distortions in the left and right eye images which will remain in the images at rendering time if the images are processed taking into consideration the intended lens geometry rather than the actual geometry of the individual lenses.

In the case of stereoscopic systems, differences between left and right eye images are normally interpreted by a human viewer as providing depth information. Unfortunately unintended differences between left and right eye images due to camera lens differences with provide a user with improper depth cues and/or result in other image distortions.

In view of the above discussion it should be appreciated that there is a need for methods and apparatus which can reduce or minimize the effect on image quality, e.g., as maybe perceived by a user of a playback system, of distortions introduced into images by camera lenses which can be used in stereoscopic systems and/or other types of systems.

SUMMARY

Methods and apparatus for reducing and/or minimizing the effect of distortions introduced by a camera lens are described. Streaming apparatus are described. Playback apparatus are also described. The methods and apparatus are particularly well suited for use in stereoscopic systems where distortions, e.g., due to lens manufacturing defects or normal manufacturing variations, can result in differences between lenses used to capture left and right eye views of a scene area.

Various features are directed to methods and apparatus which are well suited for supporting delivery, e.g., streaming, of video or other content corresponding to a 360 degree viewing area but the techniques are well suited for use in system which capture stereoscopic images of areas which do not cover a fully 360 degree view. The methods and apparatus of the present invention are particularly well suited for streaming of stereoscopic and/or other image content where data transmission constraints may make delivery of 360 degrees of content difficult to deliver at the maximum supported quality level, e.g., using best quality coding and the highest supported frame rate. However, the methods are not limited to stereoscopic content.

In various embodiments cameras which have fisheye lenses are used. A fisheye lens is a wide or ultra wide angle lens that produces strong visual distortion intended to create a wide panoramic or hemispherical image. Unfortunately, the distortions due to the use the fisheye lens may vary from lens to lens and/or from camera to camera due to lens imperfections and/or differences between the position of the lens relative to the sensor in the camera. While fisheye lens are well suited for capturing large image areas which may be later mapped or projected onto a sphere or other 3D simulated environment, the distortions introduced from camera to camera can make it difficult to reliably use images captured by cameras with fisheye lenses or make it difficult to seem images together that are captured by different lenses.

In the case of stereoscopic images, where separate left and right eye images are captured and then presented during playback to produce a 3D effect to the viewer, distortions and differences between the cameras used to capture the left and right eye images may be problematic and/or degrade the stereoscopic image quality if left unaddressed.

In various embodiments camera distortion information is generated, e.g., as part of a calibration process. The calibration information maybe, and normally is on a per camera basis with the camera including the fisheye lens. In this manner, individual camera distortions regardless of whether they are introduced by the camera lens or sensor to lens positioning may be detected. A set of correction information, sometimes referred to as a correction mesh, is generated based on the calibration information and, in some embodiments communicated to a playback device. In this way corrections for camera distortions can be performed in the playback device as opposed to being made prior to encoding and/or transmission of the images. The playback device uses the correction information, e.g., correction mesh, to correct and/or compensate for distortions introduced by an individual camera. By allowing the encoding and transmission of uncorrected images with the correction being implemented in the playback device, unintentional amplification of image artifacts which might occur during image encoding if the captured images were processed prior to transmission in an attempt to eliminate or reduce distortions introduced by differences lenses used to capture left and right eye image and/or differences from the intended lens geometry, is avoided.

The set of correction information is communicated to the playback device on a per camera basis since it is lens dependent. The correction information may, and in some embodiments does, take the form of a set of information which is used to modify a UV map, sometimes referred to as a texture map, which may be used for both the left and right eye images corresponding to the same scene area. UV mapping is the process of projecting an image sometimes referred to as a texture or texture map onto a 3D object. In various embodiments a decoded image captured by a camera is used as the texture map for a corresponding portion of the 3D model of the environment. The letters "U" and "V" denote the axes of the 2D texture because "X", "Y" and "Z" are already used to denote the axes of the 3D object in model space. UV coordinates are applied per face, e.g., with a face in a UV map having a one to one correspondence with a face in the 3D model in at least some embodiments.

Thus, in some embodiments, rendering of a left eye image involves use of mesh correction information corresponding to the left eye camera which takes into consideration distortions introduced by the left eye camera, a UV map used for both the left and right eye images and a 3D mesh module of the environment corresponding to the scene area being rendered. The 3D mesh module and UV map are common to the rendering of the left and right eye images. The correction information is lens dependent and thus separate left and right eye correction information is provided. The correction information may, and in some embodiments does, include information indicating how the position of nodes in the UV map should be changed taking into consideration the distortions introduced by the camera to which the correction information corresponds. In some embodiments, the correction information includes information identifying a node in the common UV map and information indicating how much the node position should be shifted for purposes of mapping the 2 dimensional image onto the 3D model. Thus, in some embodiments, the correction map indicates the difference between the common UV map and a desired lens dependent UV map which takes into consideration the individual lens distortions. During rendering of left eye images, the playback device maps the received left eye images to the 3D model taking into consideration the common UV map and the correction information, e.g., correction mesh, corresponding to the left eye images. During rendering of right eye images, the playback device maps the received right eye images to the 3D model taking into consideration the common UV map and the correction information, e.g., correction mesh, corresponding to the right eye images.

As should be appreciated, the rendering may apply the correction information to the information in the UV map in a variety of ways. While a modified UV map is generated for each of the left and right eye images using the correction information for the left and right eye images, respectively, and the common UV map with the modified UV maps then being used for rendering left and right eye images, in other embodiments corrections are performed by the renderer as needed. For example in some embodiments the modification information is applied to one or more nodes in the common UV map during the rendering processes as the renderer determines, based on the received information and which portion of the environment is being rendered, what nodes of the UV map are relevant to the rendering being performed and what corrections are applicable to those nodes. For example, as a segment of the 3D model is being rendered, the nodes in the UV map corresponding to the segment being rendered may be corrected based on received correction information and then the portion, e.g., segment of the received image which is identified based on the corrected UV node information is then applied to the segment of the 3D model being rendered. Various other approaches may be used as well by the renderer to apply the correction information with the particular way in which the correction information is applied during playback not being critical.

By providing correction information, e.g., mesh correction information, on a per camera basis, the correction information to be applied can be changed whenever a change in cameras supplying the content occurs without requiring a change in the UV map or 3D model. Thus communication of correction information which is camera dependent can be decoupled from the communication of UV map and/or 3D model information which can be common to the rendering of both left and right eye images of a stereoscopic pair.

In various embodiments the correction information is communicated in the form of a set of node positions identifying individual nodes in the UV map and offsets corresponding to the nodes. For example, a node in the UV map may be identified by its (U,V) coordinates with an offset being indicated for each of the U and V coordinates indicating how much the node in the UV map should be shifted within the UV space. The U,V coordinates of the node identify the node in the UV map which is to modify and, at the same time the corresponding node in the 3D map since there is, in various embodiments, a one to one mapping of nodes in the UV map or maps that are used to nodes in the 3D model.

As content corresponding to different images are combined as part of the process of rendering the images onto the 3D model masks may be used to control which decoded images provide content that will be displayed. The masks may be implemented as a set of alpha blending coefficients which control the relative contribution of the decoded image portions to the rendered image. For example, a segment determined by the corrected UV map to correspond to a segment of the 3D model will contribute to the displayed segment by an amount which depends on the blending coefficient. Different content streams may correspond to the same segment of the model with the blending coefficient determine whether the content of one stream will be displayed or if the content of multiple streams will be blended as part of the rendering process. By setting the alpha coefficient corresponding to a portion of a decoded image which is to be masked to zero, it will not contribute to the image displayed as part of the rendering processing. In some embodiments, while the content of different streams may overlap, masking is used to control which content streams contributed to the rendered portions of the 3D environment. Thus, content streams intended to provide content corresponding to one scene area may be masked during rendering when they include content which overlaps a scene area being rendered from images obtained from a different content stream.

While masking or blocking may be used in some embodiments blending is used along one or more edges where content from cameras corresponding to different directions overlapping content maybe and in some embodiments is blended together. In such systems left eye image content is blended along edges with left eye content from another stream while right eye image content is blended along edges with right eye image content from another stream. Thus streams providing image content corresponding to adjacent scene areas may be blended together along the edges while other portions may be masked to avoid blending.

The 3D environmental mesh model and corresponding UV map or maps may be and sometime are communicated at different times than the camera mesh correction information. The camera mesh correction information may be transmitted in response to a change in the camera pair being used to supply content corresponding to a part of an environment, e.g., shortly before the playback device will be supplied with content from the new camera pair. Alternatively, a plurality of correction meshes may be communicated and stored in the playback device with information identifying which correction information should be used at a particular time being signaled to the playback device. In this manner the correction meshes need not be transmitted each time there is a change in the camera pair used to supply content with a simply indicator being supplied and used by the playback device to determine which set of correction information should be applied at a given time.

In cases where the 3D model includes a large number of nodes, corrections may not be required for all nodes. In such cases the set of mesh correction information for each of the left and right eye images may include information identifying a subset of nodes in the UV map and provide node position correction information for the subset of nodes for which corrections are to be performed. Thus the mesh correction information may include entries for fewer nodes than for the full set of nodes in the UV map and corresponding portion of a 3D model.

The 3D model expresses the environment in 3D space. The captured frames are distorted based on the lens geometry. The correction mesh information is used to correct the lens distortion for each camera angle by telling the renderer how to map the received decoded image frame onto the vertices of the 3D model taking into consideration the UV map corresponding to the UV model which does not take into consideration the difference between individual lenses of a lens pair. Thus, the use of the correction information facilitates a more accurate translation of images from the camera capture domain in which lens distortions will be reflected in the captured images into that of the 3D model.

By performing the correction in the playback device rather than processing the images to compensate for the lens distortions on the transmit side helps prevent the captured images from being distorted first into a 2D equi-rectangular geometry upon which the UV map corresponding to the 3D model will be based and then encoded for transmission. The conversion of the captured images into a 2D equi-rectangular geometry prior to encoding can cause the loss of image data around the edges prior to reception by the playback device as part of the image processing particularly in the case where lossy image encoding is performed prior to transmission.

In various embodiments the 3D environment is presumed to be a sphere with a mesh of triangles being used to represent the environment in which the camera or cameras capturing images is located. While the invention is explained in the context of a spherical 3D model, it is not limited to spherical 3D models and can be used for models of other shapes.

For example in some embodiments a 3D environment is mapped and 3D environment information is communicated to the playback device and used to modify the 3D default environment mesh used to render the images during playback to take into consideration the actual physical shape of the auditorium, stadium or other environment in which the original images are captured. The 3D environment map may included information on the distance from the camera rig and thus the camera used to capture the image to a wall or other perimeter surface of the environment in which the images will be captured. The distance information can, and sometimes is, matched to a grid point of the mesh used during playback to simulate the environment and to adjust the playback images based on the actual environment from which images are taken.

In various embodiments a 3D model of and/or 3D dimensional information corresponding to an environment from which video content will be obtained is generated and/or accessed. Camera positions in the environment are documented. Multiple distinct camera positions may be present within the environment. For example, distinct end goal camera positions and one or more mid field camera positions may be supported and used to capture real time camera feeds.

The 3D module and/or other 3D information are stored in a server or the image capture device used to stream video to one or more users.

The 3D module is provided to a user playback device, e.g., a customer premise device, which has image rendering and synthesis capability. The customer premise device generates a 3D representation of the environment which is displayed to a user of the customer premise device, e.g., via a head mounted display.

In various embodiments, less than the full 360 degree environment is streamed to an individual customer premise device at any given time. The customer premise device indicates, based on user input, which camera feed is to be streamed. The user may select the court and/or camera position via an input device which is part of or attached to the customer premise device.

In some embodiments a 180 degree video stream is transmitted to the customer playback device, e.g., a live, real time, or near real time stream, from the sever and/or video cameras responsible for streaming the content. The playback device monitors a users head position and thus viewing area a user of the expected playback device is viewing within the 3D environment being generated by the playback device. The customer premise device presents video when available for a portion of the 3D environment being viewed with the video content replacing or being displayed as an alternative to the simulated 3D environment which will be presented in the absence of the video content. As a user of the playback device turns his or her head, portions of the environment presented to the user may be from the video content supplied, e.g., streamed, to the playback device with other portions being synthetically generated from the 3D model and/or previously supplied image content which was captured at a different time than the video content.

Thus, the playback device may display video, e.g., supplied via streaming, while a game, music concert or other event is still ongoing corresponding to, for example, a front 180 degree camera view with rear and/or side portions of the 3D environment being generated either fully synthetically or from image content of the side or rear areas of the environment at different times.

While a user may choose between camera positions by signaling a change in position to the server providing the streaming content, the server providing the streaming content may provide information useful to generating the synthetic environment for portions of the 3D environment which are not being streamed.

For example, in some embodiments multiple rear and side views are captured at different times, e.g., prior to streaming a portion of content or from an earlier point in time. The images are buffered in the playback device. The server providing the content can, and in some embodiments does, signal to the playback device which of a set of non-real time scenes or images to be used for synthesis of environmental portions which are not being supplied in the video stream. For example, an image of concert participants sitting and another image of concert participants standing behind a camera position may be supplied to and stored in the playback device. The server may signal which set of stored image data should be used at a particular point in time. Thus, when a crowed is standing the server may signal that the image corresponding to a crowd standing should be used for the background 180 degree view during image synthesis while when a crowd is sitting the server may indicate to the customer premise device that it should use an image or image synthesis information corresponding to a crowd which is sitting when synthesizing side or rear portions of the 3D camera environment.

In at least some embodiments the orientation of the cameras at each of the one or more positions in the 3D environment is tracked during image capture. Markers and/or identifying points in the environment may be used to facilitate alignment and/or other mapping of the captured images, e.g., live images, to the previously modeled and/or mapped 3D environment to be simulated by the customer premise device.

Blending of synthetic environment portions and real (streamed video) provides for an immersive video experience. Environments can and sometimes are measured or modeled using 3d photometry to create the 3D information used to simulate the environment when video is not available, e.g., where the environment was not previously modeled.

Use of fiducial markers in the real world space at determined locations assist with calibration and alignment of the video with the previously generated 3D model.

Positional tracking of each camera is implemented as video is captured. Camera position information relative to the venue, e.g., that maps X, Y, Z and yaw in degrees (so we know where each camera is pointed). This allows for easy detection of what portion of the environment the captured image corresponds to and allows, when communicated to the playback device along with captured video, for the playback to automatically overlay our video capture with the synthetic environment generated by the playback device during image presentation, e.g., playback to the user. The streamed content can be limited to less than a 360 degree view, e.g. a captured 180 degree view of the area in front of the camera position. As the viewer looks around, they will see the simulated background (not a black void) when turned to the rear and the video when turned to the front.

The synthetic environment can and in some embodiment is interactive. In some embodiment multiple actual viewers, e.g., users of different customer premise devices, are included in the simulated environment so that a user can watch the game with his/her friends in the virtual 3D environment, and it seems that the users are actually at the stadium.

The images of the users may be, and in some embodiments are, captured by cameras included with or attached to the customer premise devices, supplied to the server and provided to the other users, e.g., members of a group, for use in generating the simulated environment. The user images need not be real time images but maybe real time images.

The methods can be used to encode and provide content in real time or near real time but are not limited to such real time applications. Given the ability to support real time and near real time encoding and streaming to multiple users, the methods and apparatus described herein are well suited for streaming scenes of sporting events, concerts and/or other venues where individuals like to view an even and observe not only the stage or field but be able to turn and appreciate views of the environment, e.g., stadium or crowd. By supporting 360 degree viewing and 3d the methods and apparatus of the present invention are well suited for use with head mounted displays intended to provide a user a 3d immersive experience with the freedom to turn and observe a scene from different viewing angles as might be the case if present and the users head turned to the left, right or rear.

BRIEF DESCRIPTION OF THE FIGURES

FIG. 24B is a second part of a flowchart illustrating the steps of an exemplary content playback method, in accordance with an exemplary embodiment.

FIG. 24 comprises a combination of FIGS. 24A and 24B illustrating the flowchart of the content playback method of providing image content, in accordance with an exemplary embodiment.

DETAILED DESCRIPTION

Figure 1:
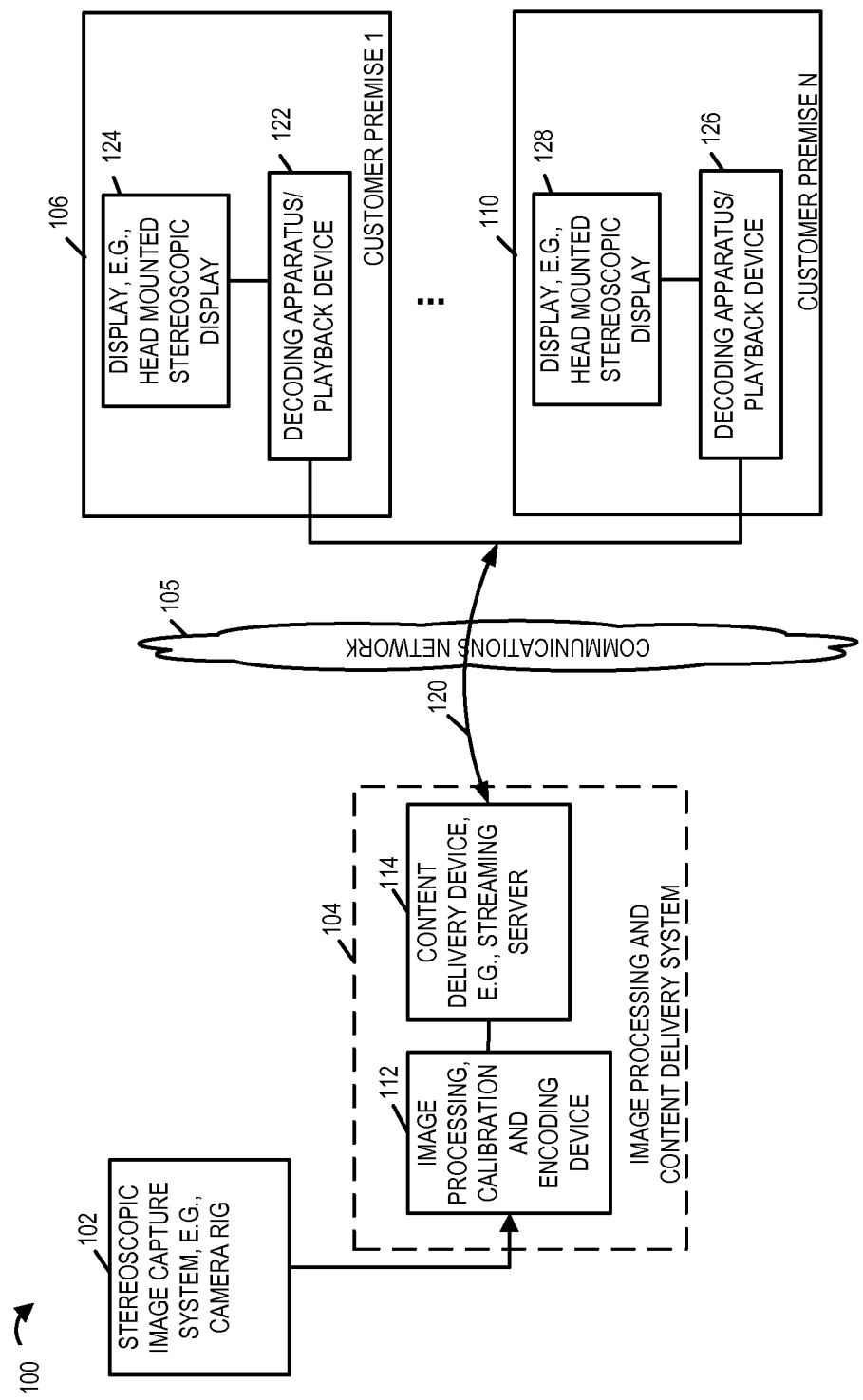
FIG. 1 illustrates an exemplary system implemented in accordance with some embodiments of the invention which can be used to capture, stream content, and output content to one or more users along in a synthesized environment.

FIG. 1 illustrates an exemplary system 100 implemented in accordance with some embodiments of the invention. The system 900 supports content delivery, e.g., imaging content delivery, to one or more customer devices, e.g., playback devices/content players, located at customer premises. The system 900 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/r environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content maybe and sometimes is a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content for delivering the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server are shown as separate physical devices in the FIG. 1 example, in some embodiments they are implemented as a single device which encodes and streams content. The encoding process may be a 3d, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of devices/players, e.g., decoding apparatus to decode and playback/display the imaging content streamed by the content streaming device 114. Customer premise 1 106 includes a decoding apparatus/playback device 122 coupled to a display device 124 while customer premise N 110 includes a decoding apparatus/playback device 126 coupled to a display device 128. In some embodiments the display devices 124, 128 are head mounted stereoscopic display devices.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 8. A system/playback device such as the one illustrated in FIG. 8 can be used as any of the decoding apparatus/playback devices 122, 126.

Figure 2:
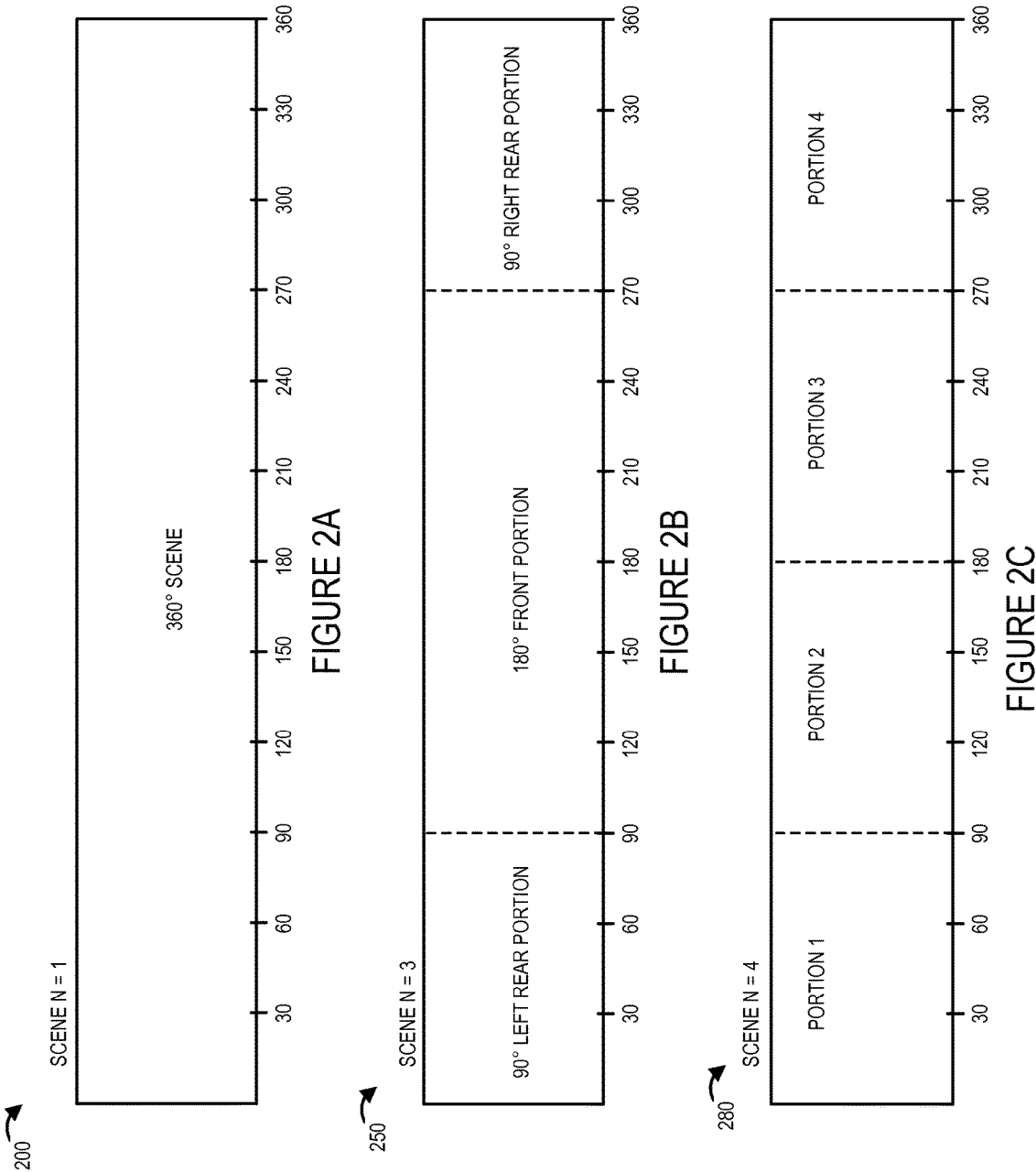
FIG. 2A illustrates an exemplary stereoscopic scene, e.g., a full 360 degree stereoscopic scene which has not been partitioned.
FIG. 2B illustrates an exemplary stereoscopic scene which has been partitioned into 3 exemplary scenes in accordance with one exemplary embodiment.
FIG. 2C illustrates an exemplary stereoscopic scene which has been partitioned into 4 scenes in accordance with one exemplary embodiment.

FIG. 2A illustrates an exemplary stereoscopic scene 200, e.g., a full 360 degree stereoscopic scene which has not been partitioned. The stereoscopic scene maybe and normally is the result of combining image data captured from multiple cameras, e.g., video cameras, often mounted on a single video capture platform or camera mount.

FIG. 2B illustrates a partitioned version 250 of the exemplary stereoscopic scene 200 where the scene has been partitioned into 3 (N=3) exemplary portions, e.g., a front 180 degree portion, a left rear 90 degree portion and a right rear 90 degree portion in accordance with one exemplary embodiment.

FIG. 2C illustrates another portioned version 280 of the exemplary stereoscopic scene 200 which has been partitioned into 4 (N=4) portions in accordance with one exemplary embodiment.

While FIGS. 2B and 2C show two exemplary partitions, it should be appreciated that other partitions are possible. For example the scene 200 may be portioned into twelve (n=12) 30 degree portions. In one such embodiment, rather than individual encoding each partition, multiple partitions are grouped together and encoded as a group. Different groups of partitions may be endowed and streamed to the user with the size of each group being the same in terms of total degrees of scene but corresponding to a different portions of an image which may be streamed depending on the user's head position, e.g., viewing angle as measured on the scale of 0 to 360 degrees.

Figure 3:
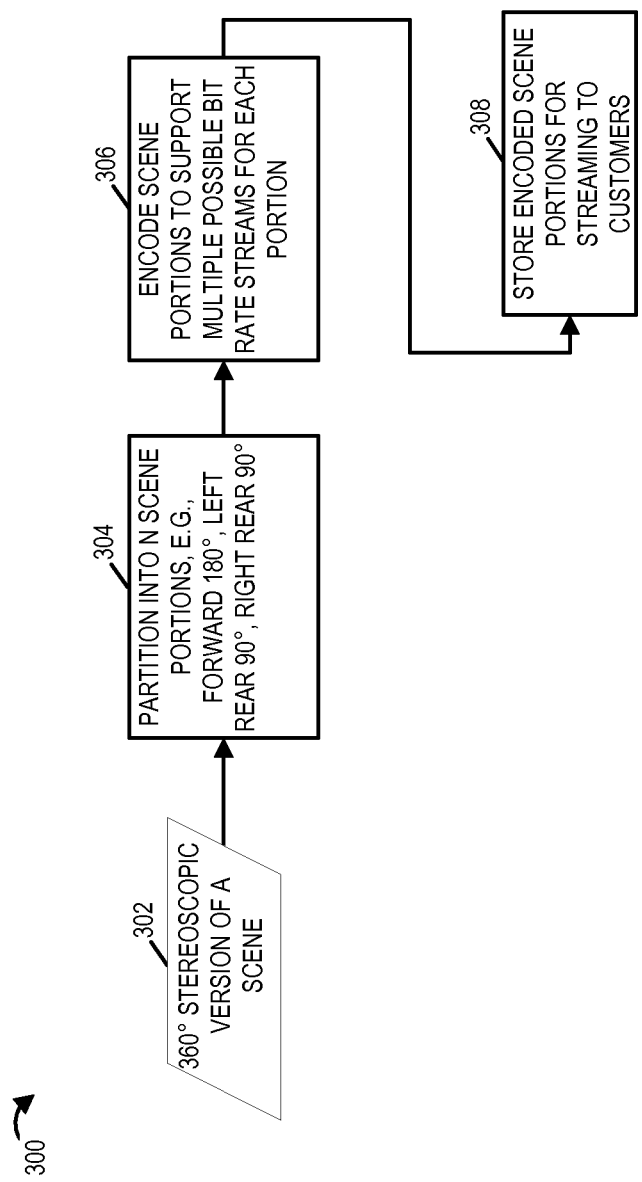
FIG. 3 illustrates an exemplary process of encoding an exemplary 360 degree stereoscopic scene in accordance with one exemplary embodiment.

FIG. 3 illustrates an exemplary process of encoding an exemplary 360 degree stereoscopic scene in accordance with one exemplary embodiment. The input to the method 300 shown in FIG. 3 includes 360 degree stereoscopic image data captured by, e.g., a plurality of cameras arranged to capture a 360 degree view of a scene. The stereoscopic image data, e.g., stereoscopic video, may be in any of a variety of known formats and includes, in most embodiments, left and right eye image data used to allow for a 3D experience. While the methods are particularly well suited for stereoscopic video, the techniques and methods described herein can also be applied to 2D images, e.g., of a 360 degree or small scene area.

In step 304 the scene data 302 is partitioned into data corresponding to different scene areas, e.g., N scene areas corresponding to different viewing directions. For example, in one embodiment such as the one shown in FIG. 2B the 360 degree scene area is portioned into three partitions a left rear portion corresponding to a 90 degree portion, a front 180 degree portion and a right rear 90 degree portion. The different portions may have been captured by different cameras but this is not necessary and in fact the 360 degree scene may be constructed from data captured from multiple cameras before dividing into the N scene areas as shown in FIGS. 2B and 2C.

In step 306 the data corresponding the different scene portions is encoded in accordance with the invention. In some embodiments each scene portion is independently encoded by multiple encoders to support multiple possible bit rate streams for each portion. In step 308 the encoded scene portions are stored, e.g., in the content delivery 104, for streaming to the customer playback devices.

Figure 4:
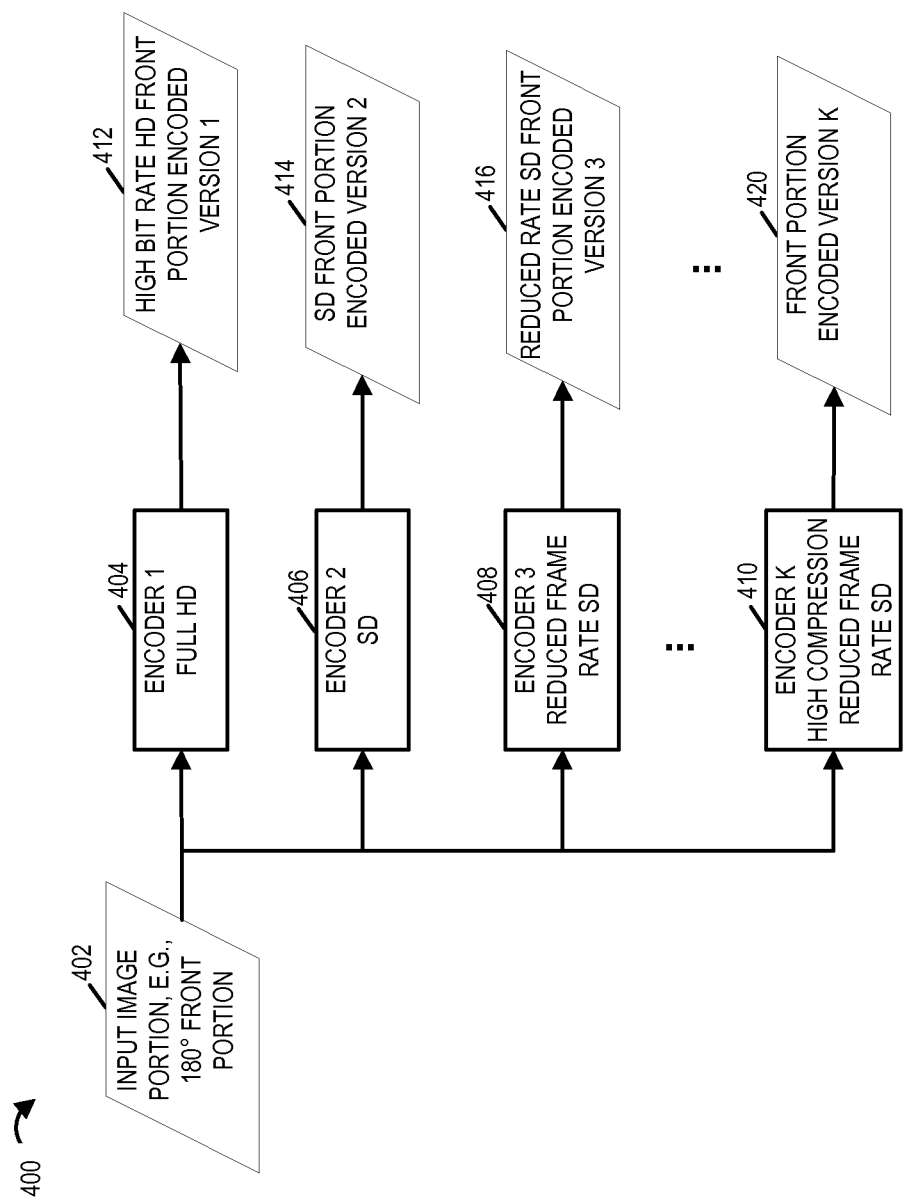
FIG. 4 illustrates an example showing how an input image portion is encoded using a variety of encoders to generate different encoded versions of the same input image portion.

FIG. 4 is a drawing 400 illustrating an example showing how an input image portion, e.g., a 180 degree front portion of a scene, is encoded using a variety of encoders to generate different encoded versions of the same input image portion.

As shown in drawing 400, an input scene portion 402 e.g., a 180 degree front portion of a scene, is supplied to a plurality of encoders for encoding. In the example there are K different encoders which encode input data with different resolutions and using different encoding techniques to generate encoded data to support different data rate streams of image content. The plurality of K encoders include a high definition (HD) encoder 1 404, a standard definition (SD) encoder 2 406, a reduced frame rate SD encoder 3 408, . . . , and a high compression reduced frame rate SD encoder K 410.

The HD encoder 1 404 is configured to perform full high definition (HD) encoding to produce high bit rate HD encoded image 412. The SD encoder 2 406 is configured to perform low resolution standard definition encoding to produce a SD encoded version 2 414 of the input image. The reduced frame rate SD encoder 3 408 is configured to perform reduced frame rate low resolution SD encoding to produce a reduced rate SD encoded version 3 416 of the input image. The reduced frame rate may be, e.g., half of the frame rate used by the SD encoder 2 406 for encoding. The high compression reduced frame rate SD encoder K 410 is configured to perform reduced frame rate low resolution SD encoding with high compression to produce a highly compressed reduced rate SD encoded version K 420 of the input image.

Thus it should be appreciated that control of spatial and/or temporal resolution can be used to produce data streams of different data rates and control of other encoder settings such as the level of data compression may also be used alone or in addition to control of spatial and/or temporal resolution to produce data streams corresponding to a scene portion with one or more desired data rates.

Figure 5:
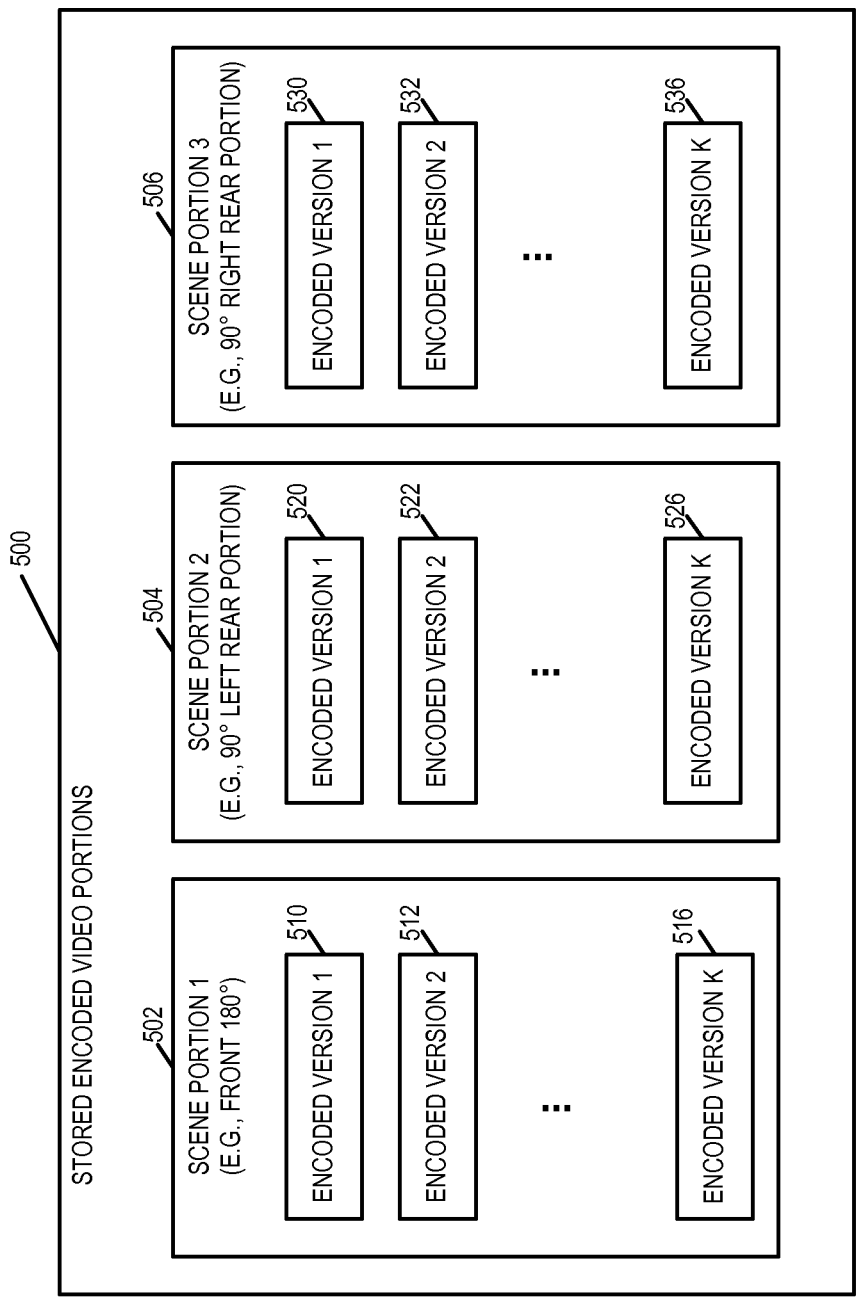
FIG. 5 illustrates stored encoded portions of an input stereoscopic scene that has been partitioned into 3 portions.

FIG. 5 illustrates stored encoded portions 500 of an input stereoscopic scene that has been partitioned into 3 exemplary portions. The stored encoded portions may be stored in the content delivery system 104, e.g., as data/information in the memory. The stored encoded portions 500 of the stereoscopic scene includes 3 different sets of encoded portions, where each portion corresponding to a different scene area and each set including a plurality of different encoded versions of the corresponding scene portion. Each encoded version is a version of encoded video data and thus represents multiple frames which have been coded. It should be appreciated that each encoded version 510, 512, 516 being video corresponds to multiple periods of time and that when streaming, the portion, e.g., frames, corresponding to the period of time being played back will used for transmission purposes.

As illustrated and discussed above with regard to FIG. 4, each scene portion, e.g., front, rear scene portions, may be encoded using a plurality of different encoders to produce K different versions of the same scene portion. The outputs of each encoder corresponding to a given input scene are grouped together as a set and stored. The first set of encoded scene portions 502 corresponds to the front 180 degree scene portion, and includes encoded version 1 510 of the front 180 degree scene, encoded version 2 512, . . . , and encoded version K 516. The second set of encoded scene portions 504 corresponds to the scene portion 2, e.g., 90 degree left rear scene portion, and includes encoded version 1 520 of the 90 degree left rear scene portion, encoded version 2 522, . . . , and encoded version K 526 of the 90 degree left rear scene portion. Similarly the third set of encoded scene portions 506 corresponds to the scene portion 3, e.g., 90 degree right rear scene portion, and includes encoded version 1 530 of the 90 degree right rear scene portion, encoded version 2 532, . . . , and encoded version K 536 of the 90 degree right rear scene portion.

The various different stored encoded portions of the 360 degree scene can be used generate various different bit rate streams for sending to the customer playback devices.

Figure 6:
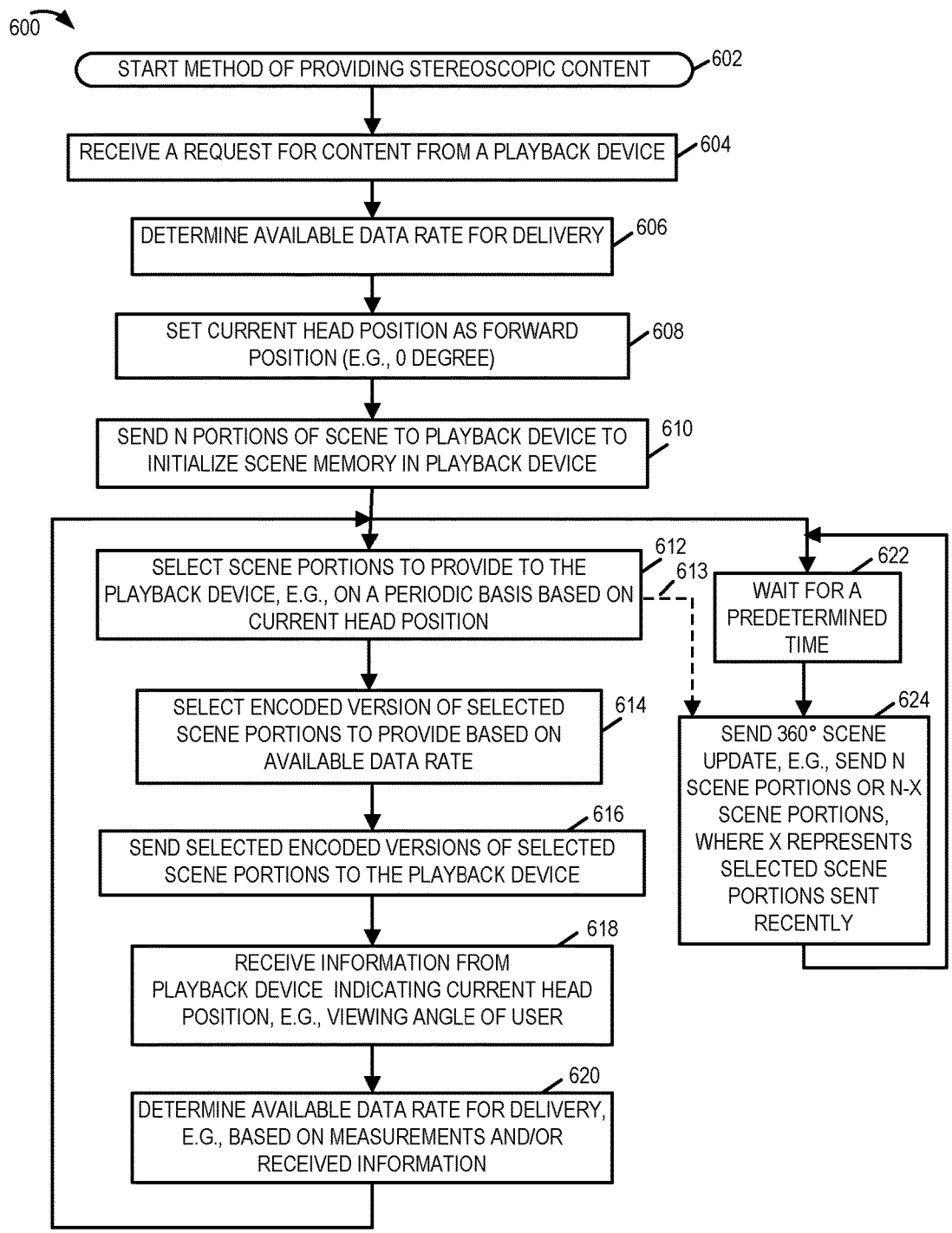
FIG. 6 is a flowchart illustrating the steps of an exemplary method of streaming content in accordance with an exemplary embodiment implemented using the system of FIG. 1.

FIG. 6 is a flowchart 600 illustrating the steps of an exemplary method of providing image content, in accordance with an exemplary embodiment. The method of flowchart 600 is implemented in some embodiments using the capturing system shown in FIG. 1.

The method starts in step 602, e.g., with the delivery system being powered on and initialized. The method proceeds from start step 602 to steps 604. In step 604 the content delivery system 104, e.g., the server 114 within the system 104, receives a request for content, e.g., a request for a previously encoded program or, in some cases, a live event being encoded and steamed in real or near real time, e.g., while the event is still ongoing.

In response to the request, in step 604, the server 114 determines the data rate available for delivery. The data rate may be determined from information included in the request indicating the supported data rates and/or from other information such as network information indicating the maximum bandwidth that is available for delivering content to the requesting device. As should be appreciated the available data rate may vary depending on network loading and may change during the period of time in which content is being streamed. Changes may be reported by the user device or detected from messages or signals indicating that packets are being dropped or delayed beyond a desired amount of time indicating that the network is having difficulty supporting the data rate being used and that the currently available data rate is lower than the original data rate determined to be available for use.

Operation proceeds from step 608 to step 608 where the current head position of the user device from which the request for content is initialized, e.g., the current head position at the time of the request is to be the 0 degree position. The 0 degree or forward looking position may be re-initialized in some embodiments by the user with the playback device signaling that a re-initialization is to occur. Over time the user's head position and/or changes in the user's head position, e.g., relative to the original head position, are reported to the content delivery system 104 and the updated position is used as will be discussed below to make content delivery decisions.

Operation proceeds from step 608 to step 610 in which portions of a 360 degree scene corresponding to the requested content are sent to initialize the playback device. In at least some embodiments the initialization involves sending a full 360 degree set of scene data, e.g., N portions where the 360 degree scene is divided into N portions.

As a result of the initialization in step 610, the playback device will have scene data corresponding to each of the different portions of 360 degree possible viewing area. Accordingly, if the user of the playback device suddenly turns to the rear, at least some data will be available to display to the user even if it is not as up to date as the portion the user was viewing prior to turning his head.

Operation proceeds from step 610 to steps 612 and step 622. Step 622 corresponds to a global scene update path which is used to make sure the playback device receives an updated version of the entire 360 degree scene at least once every global update period. Having been initialized in step 610 the global update process is delayed in wait step 622 for a predetermined period of time. Then in step 624 a 360 degree scene update is performed. The dashed arrow 613 represents the communication of information on which scene portions were communicated to the playback device during the aid period corresponding to step 622. In step 624 an entire 360 degree scene may be transmitted. However, in some embodiments not all portions are transmitted in step 624. Portions of the scene which were updated during the wait period 622 are omitted in some embodiments from the update performed in step 624 since they were already refreshed during the normal streaming processes which sends at least some portions of the scene based on the user's head position.

Operation proceeds from step 624 back to wait step 622 where a wait is performed prior to the next global update. It should be appreciated that by adjusting the wait period used in step 622 different global refresh rates can be supported. In some embodiments, the content server selects a wait period and thus global reference period, based on the type of scene content being provided. In the case of sporting events where the main action is in the forward facing area and one of the reasons for the refresh is possible changes in outdoor lighting conditions, the wait period may be relatively long, e.g., on the order of a minute or minutes. In the case of a rock concert where the action and activity in the crowd may change frequently as different songs are performed the global refresh rate maybe, and sometimes is, higher than for sporting events since a user may want to turn and see the crowds reaction and get a feel for what is going on in the crowd in addition to what is going on in the front stage viewing area.

In some embodiments the global reference period is changed as a function of the portion of the presentation being streamed. For example, during a game portion of a sporting event the global refresh rate may be relatively low but during a post touchdown moment or during a time out or intermission where a person at the event or viewing the event via the playback device is more likely to turn his or her head from the forward main area, the global reference rate may, and in some embodiment is, increased by reducing the wait, e.g., refresh period control, used in step 622.

While the global refresh process has been described with reference to steps 622 and 624, the normal supply of portions of scene are described. As should be appreciated the normal refresh of a scene or scene portion will occur for at least one portion, data rate permitting, at the supported video frame rate. Thus, with regard to at least one frame portion, e.g., the portion which his/or her head is indicated to be facing, will be supplied at the full video streaming frame rate assuming the available data rate is sufficient.

In step 612 scene portions are selected to be provided based on the indicated head position, e.g., viewing angle, of the user. The selected portions are transmitted, e.g., streamed, to the playback device, e.g., on a periodic basis. The rate at which the data corresponding to the portions are streamed depends on, in some embodiments the video frame rate. For example, at least one selected portion will be streamed at the full frame rate being supported. While at least one scene portion is selected in step 612 normally multiple scene portions are selected, e.g., the scene portion which the user is facing as well as the next nearest scene portion. Additional scene portions may also be selected and supplied if the data rate available is sufficient to support communication of multiple frame portions.

After the scene portions to be streamed are selected in step 612, operation proceeds to step 614 wherein the encoded version of the selected stream portions are selected, e.g., based on the available data rate and the viewing position of the user. For example a full rate high resolution version of the scene portion which the user is facing as indicated by the current reported head portion may and normally will be streamed. One more scene portions to the left and/or right of the current head position may be selected to be streamed as a lower resolution, lower temporal rate or using another encoding approach which reduces the amount of bandwidth required to transmit the scene area not currently being viewed. Selection of the encoded version of the adjacent scene portion will depend on the amount of bandwidth reaming after a high quality version of the scene portion currently being viewed is transmitted. While scene portions which are not currently being viewed may be sent as a lower resolution encoded version or as an encoded version with a greater temporal distance between frames, full resolution high quality version may be sent periodically or frequently if there is sufficient bandwidth available.

In step 616 the selected encoded versions of the selected scene portions are sent to the playback device which requested the content. Thus, in step 616 the encoded content corresponding to one or more portions, e.g., stereoscopic video content corresponding to multiple sequential frames, is streamed to the playback device.

Operation proceeds from step 616 to step 618 in which information indicating a current head position of a user is received. This information may be sent from the playback device periodically and/or in response to detecting a change in head position. In addition to changes in head position, changes in the available data rate may affect what content is streamed. Operation proceeds form step 618 to step 620 in which a determination of the current data rate which can be used for content delivery to the playback device. Thus, the content delivery system can detect changes in the amount of bandwidth available to support streaming to the requesting device.

Operation proceeds from step 620 to step 612 with streaming continuing until the content is fully delivered, e.g., the program or event ends, or until a signal is received from the playback device which requested the content indicating that the session is to be terminated or the failure to receive an expected signal from the playback device such as a head position update is detected indicating that the playback device is no longer in communication with the content server 114.

From the scene data delivered in the manner described above, the playback device will have at least some data corresponding to each scene portion available to it to display in the event a user quickly turns his or her head. It should be appreciated that user's rarely turn their head completely around in a very short period of time since this is an uncomfortable change in viewing position for many people. Accordingly, while the full 360 degree scene may not be transmitted at all times, a high quality version of the scene portion(s) most likely to be viewed at any given time may be streamed and made available to the user.

The content delivery system 104 can support a large number of concurrent users since, the encoding process allows the N portions of a scene to be transmitted and processed differently to different users without having to encode the content separately for each individual user. Thus, while a number of parallel encoders may be used to support real time encoding to allow for real or near real time streaming of sports or other events, the number of encoders used tends to be far less than the number of playback devices to which the content is streamed.

While the portions of content are described as portions corresponding to a 360 degree view it should be appreciated that the scenes may, and in some embodiments do, represent a flattened version of a space which also has a vertical dimension. The playback device is able to map the scene portions using a model of the 3d environment, e.g., space, and adjust for vertical viewing positions. Thus, the 360 degrees which are discussed in the present application refer to the head position relative to the horizontal as if a user changed his viewing angle left or right while holding his gaze level.

Figure 7:
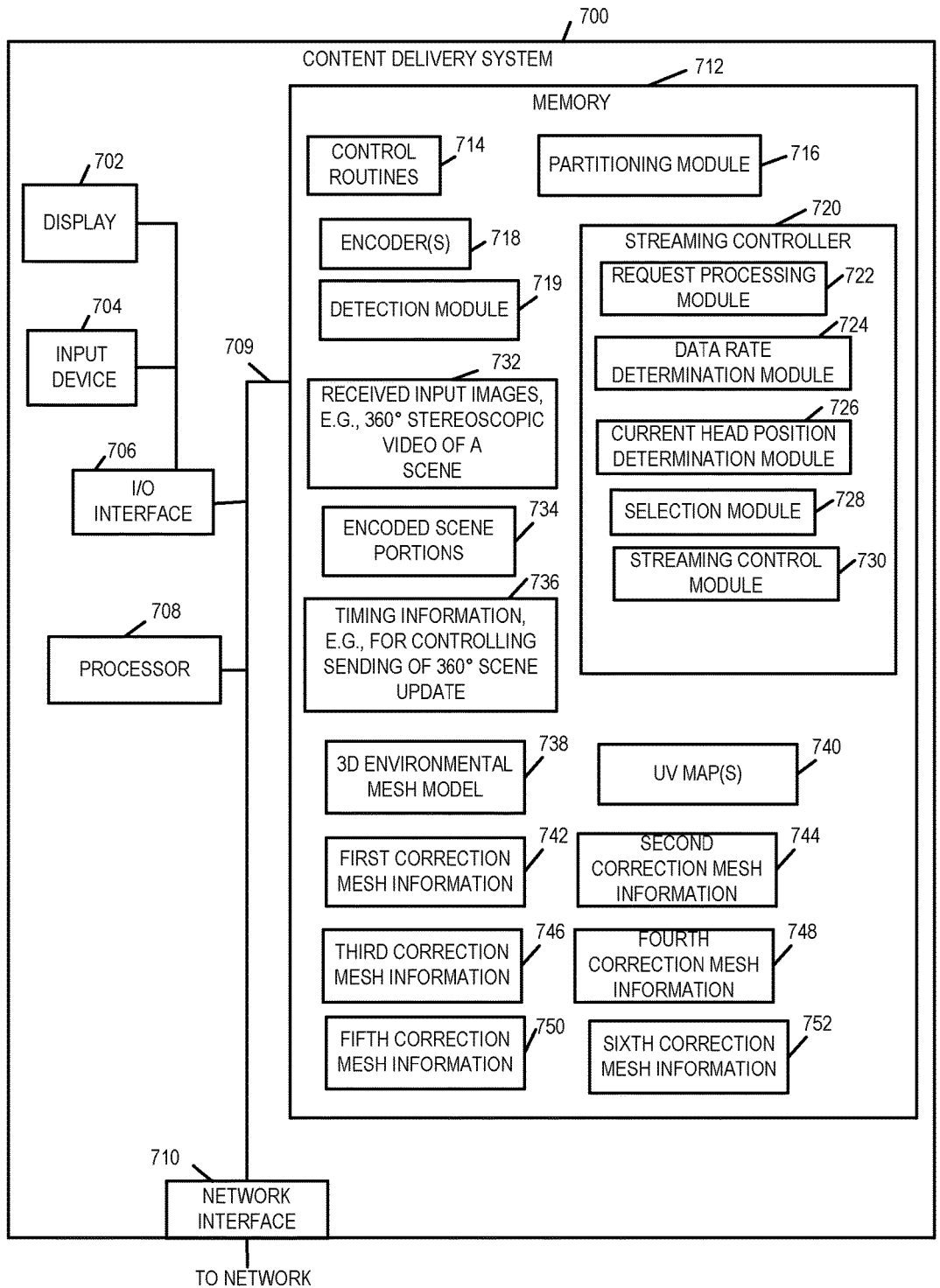
FIG. 7 illustrates an exemplary content delivery system encoding capability that can be used to encode and stream content in accordance with the features of the invention.

FIG. 7 illustrates an exemplary content delivery system 700 with encoding capability that can be used to encode and stream content in accordance with the features of the invention.

The system may be used to perform encoding, storage, and transmission and/or content output in accordance with the features of the invention. In some embodiments the system 700 or the elements therein perform the operation corresponding to the process illustrated in FIG. 6 and FIG. 23. The content delivery system 700 may be used as the system 104 of FIG. 1. While the system shown in FIG. 7 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360 degree version of a scene into N scene portions in accordance with the features of the invention.

The encoder(s) 718 may, and in some embodiments do, include a plurality of encoders configured to encode received image content, e.g., 360 degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105. In various embodiments various steps of the flowchart 600 and/or flowchart 2300 are implemented by the elements of the streaming controller 720.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360 degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360 degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 730 waits for a predetermined time after initially sending N scene portions for initialization before sending the 360 degree scene update. In some embodiments the timing information to control sending of the 360 degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360 degree version of said scene at least once during each refresh period.

Figure 13:
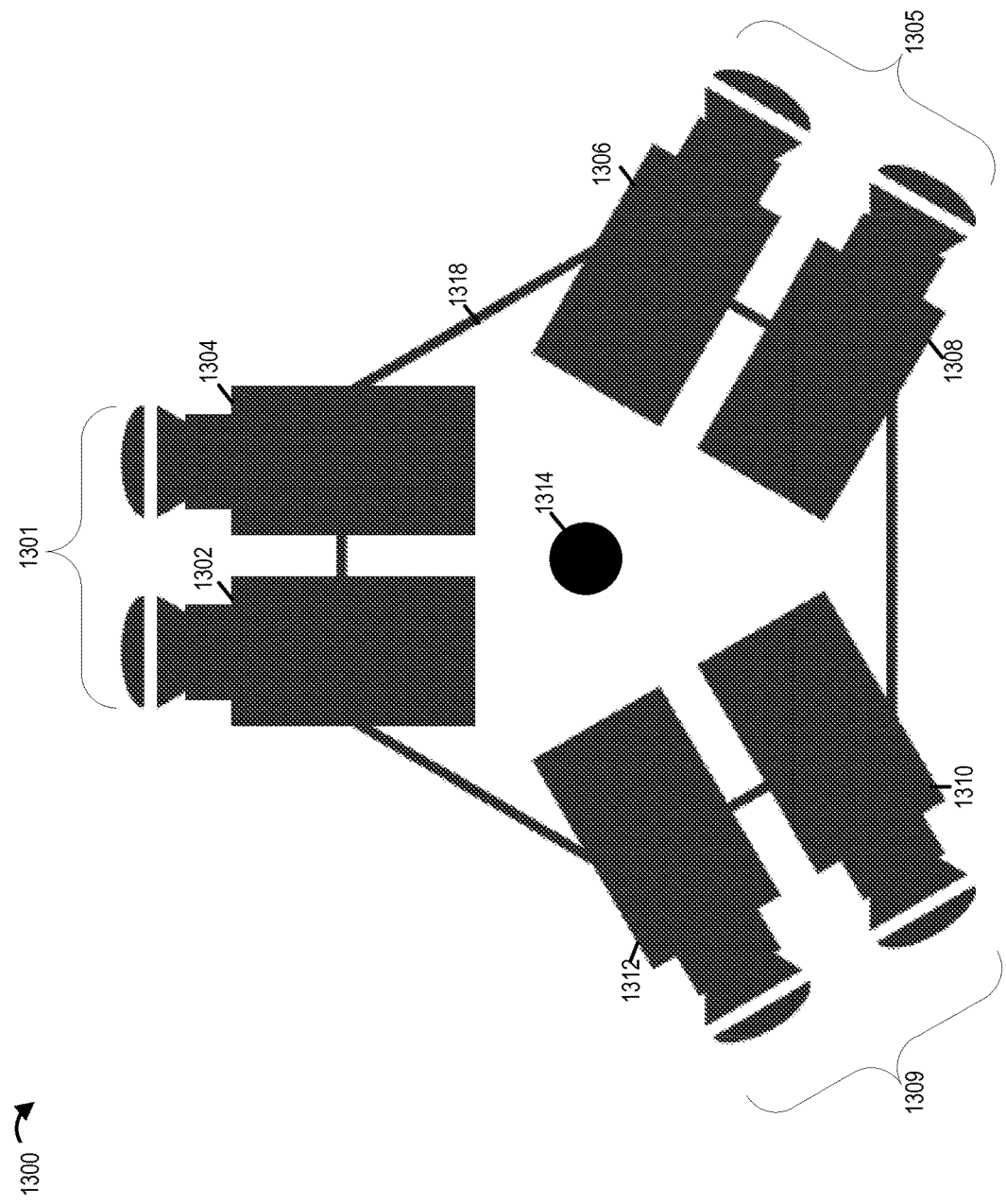
FIG. 13 illustrates a camera rig including multiple camera pairs for capturing left and right eye images corresponding to different 120 degree sectors of a 360 degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 13. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments the first correction mesh information is for use in rendering image content captured by a first camera of a first stereoscopic camera pair, the second correction mesh information is for use in rendering image content captured by a second camera of the first stereoscopic camera pair, the third correction mesh information is for use in rendering image content captured by a first camera of a second stereoscopic camera pair, the fourth correction mesh information is for use in rendering image content captured by a second camera of the second stereoscopic camera pair, the fifth correction mesh information is for use in rendering image content captured by a first camera of a third stereoscopic camera pair, the sixth correction mesh information is for use in rendering image content captured by a second camera of the third stereoscopic camera pair. In some embodiments the streaming controller 720 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 720 is further configured to indicate to the playback device that the third and fourth correction mesh information should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of a image rendering operation. The first correction mesh information 742 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 708 is configured to perform the various functions corresponding to the steps discussed in flowcharts 600 and/or 2300. In some embodiments the processor uses routines and information stored in memory to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor is further configured to control the system 700 to transmit a stereoscopic content stream including encoded images generated from image content captured by the first and second cameras. In some embodiments the processor 708 is further configured to transmit to the playback device an environmental mesh model to be used in rendering image content. In some embodiments the processor 708 is further configured to transmit to the playback device a first UV map to be used for mapping portions of images captured by the first stereoscopic camera pair to a portion of the environmental mesh model as part of a image rendering operation. In some embodiments the processor 708 is further configured to control the system 700 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information should be used when content captured by the second camera pair is streamed to the playback device instead of content from the first camera pair. In some embodiments the processor 708 is further configured to control the system 700 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

Figure 8:
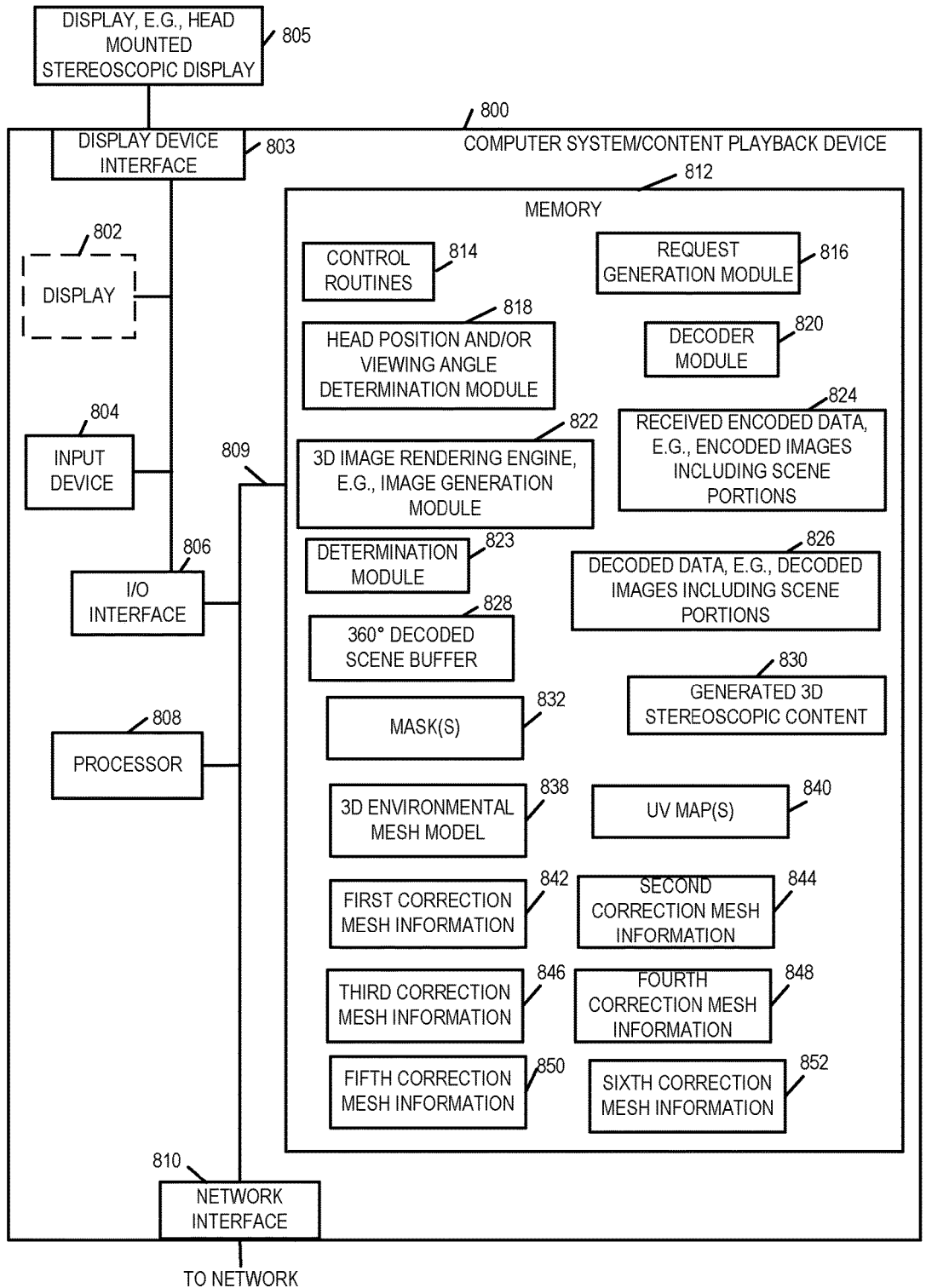
FIG. 8 illustrates an exemplary content playback device that can be used to receive, decode and display the content streamed by the system of FIG. 7.

FIG. 8 illustrates a computer system/playback device 800 implemented in accordance with the present invention which can be used to receive, decode, store and display imaging content received from a content delivery system such as the one shown in FIGS. 1 and 7. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 1108 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module, and data/information including received encoded image content 824, decoded image content 826, a 360 degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the. The operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 7 and memory 812 of FIG. 8 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 7 and 8 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

While shown in each of FIGS. 7 and 8 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the system 700 or elements therein such as the processor 708, to perform the functions of corresponding steps of the methods of the present invention, e.g., such as those illustrated and/or described in the flowcharts 600, 1100 and 2300. Similarly the modules illustrated in FIG. 8 control and/or configure the system 800 or elements therein such as the processor 808, to perform the functions of corresponding steps of the methods of the present invention, e.g., such as those illustrated and/or described in the flowchart 1200, 2400 and 2500.

Figure 9:
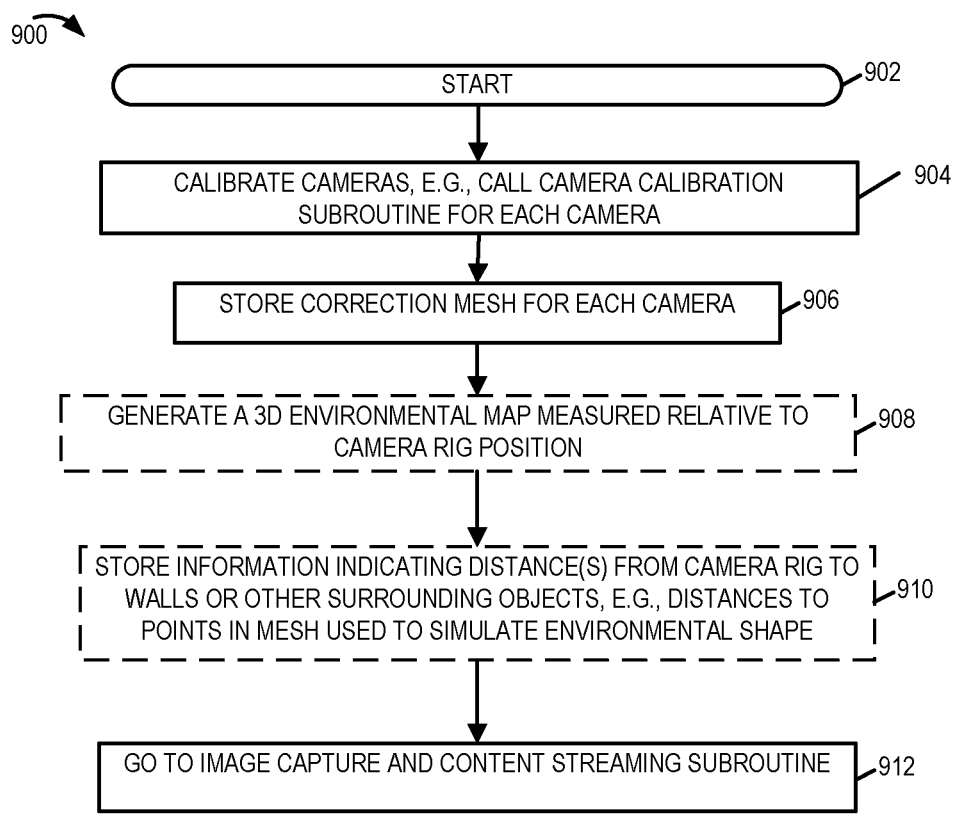
FIG. 9 illustrates a first portion of a camera calibration, image encoding and content streaming method in the form of a flow chart and implemented in accordance with one exemplary embodiment that may be implemented by the system shown in FIG. 1.

FIG. 9 illustrates a first portion of a camera calibration, image encoding and content streaming method 900 in the form of a flow chart. The exemplary method may be, and in some embodiments is, implemented by the system 104 shown in FIG. 1. The method shown in FIG. 9 is preformed by the image processing calibration and encoding device 112 for each camera of the camera rig 102.

The method starts in step 902, e.g., when a camera is connected to the system 104 for the first time, e.g., at an event site. In step 904 a camera calibration operation is initiated by a call to a camera calibration subroutine. The camera calibration subroutine is called for each camera of the rig 102 with left and right cameras of a stereoscopic pair being calibrated individually.

Figure 10:
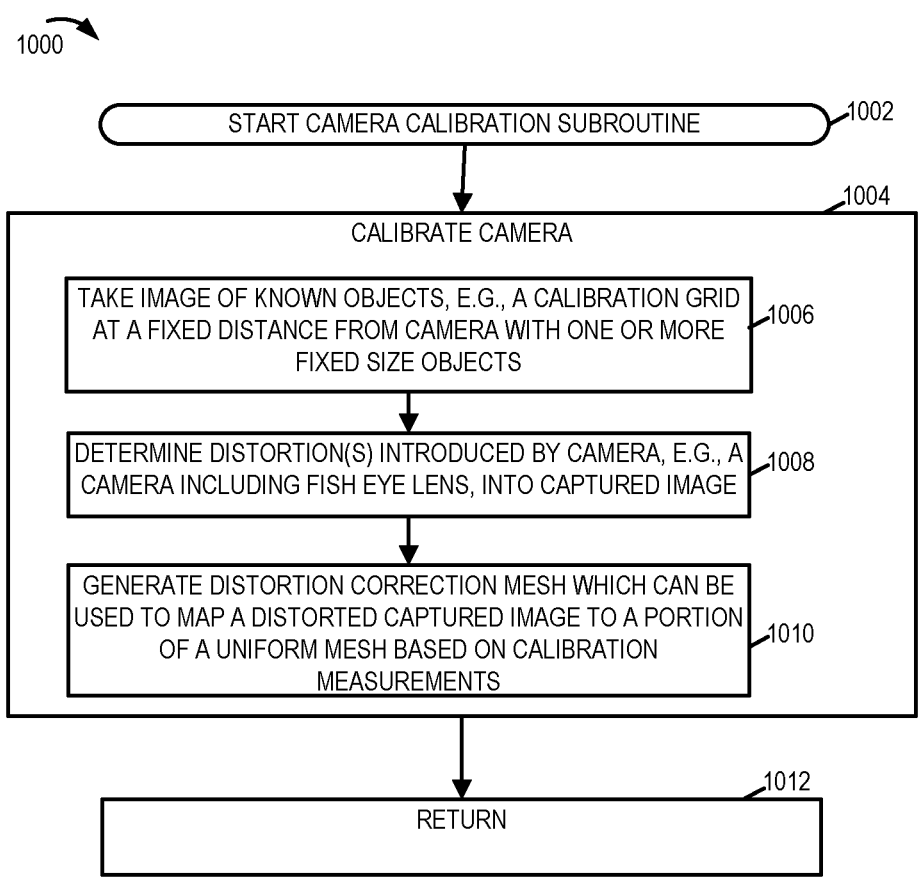
FIG. 10 illustrates a camera calibration subroutine which may be called by the flow chart of FIG. 9.

Referring now briefly to FIG. 10, there is illustrated an exemplary calibration subroutine 1000 which may be called in step 904. The camera calibration routine starts in step 1002 when it is called. Operation proceeds from start step 1002 to step 1004 in which an image is taken of one or more know objects, e.g., a calibration grid positioned at a fixed know distance from the camera to be calibrated with one or more know fixed size objects on the grid or nearby. Operation proceeds then to step 1008 win which the captured image or images corresponding to the calibration grid and/or objects are processed to detect distortions introduced the camera being calibrated. Then, in step 1010 a distortion correction mesh is generated from the calibration measurements and detected image distortions. The correction mesh can be applied to the captured images as part of an image correction operation to reverse or reduce one or more distortions introduced by the camera and the fisheye lens included as part of the camera. The mesh allows for what may be considered "flattening" of a captured image to reverse the distortions and/or curving introduced as part of the image capture process. Once the distortion correction mesh for the individual camera being calibrated has been created, it is stored for future use and/or transmission to a playback device which can then, as described below, use the mesh to correct distortions introduced into captured images prior to presenting portions of the images or applying the images to a simulated environment.

In some embodiments the correction mesh is implemented as a set of mesh information indicating the nodal positions of nodes in a regular uniform mesh with offset information for each nodal point where the location in the correction mesh differs from the nodal position in a regular mesh. Such embodiments are particularly useful where which a UV map for mapping an image to be applied to a corresponding portion of a 3D mesh model of the environment has a regular structure. For example consider FIG. 20 which shows a mesh which may be used as a UV map for mapping a flat image to a 3D mesh model, e.g., sphere. Intersecting lines represent nodes in the regular mesh shown in FIG. 20. The correction mesh shown in FIG. 19 includes nodes which correspond to the regular mesh shown in FIG. 20 which may be used as a UV map. A UV map refers to a 2D map with nodes that correspond, at least in some embodiments to nodes of a 3D model. The UV map can be used to determine which sections of the 2D image, sometimes referred to as a texture, to wrap onto corresponding sections of the 3D model.

Figure 19:
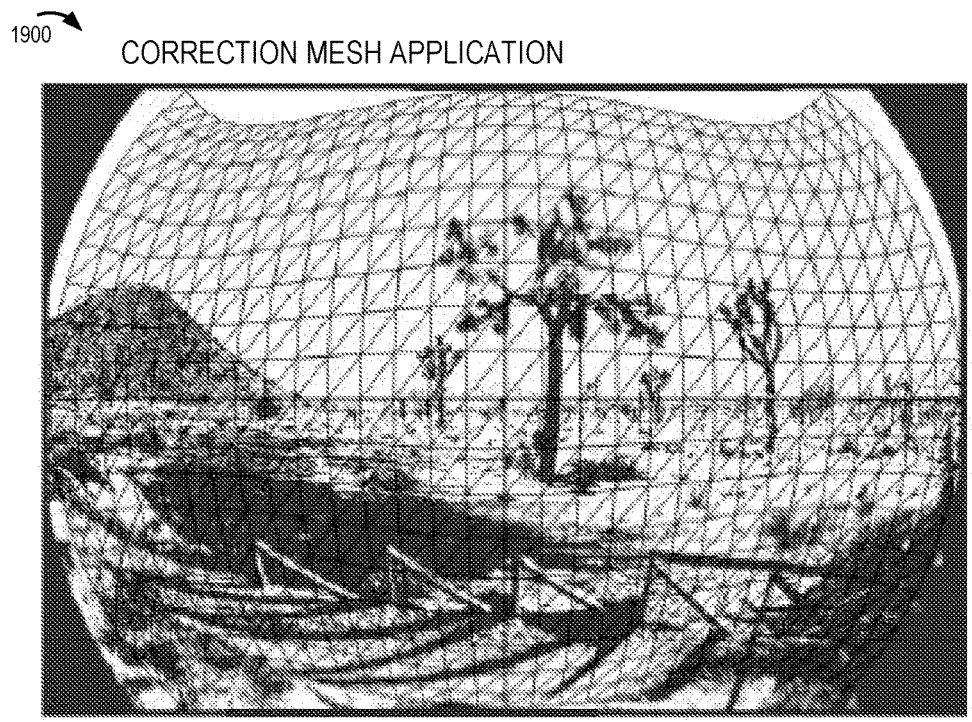
FIG. 19 shows application of the correction mesh to a image captured by the camera to which the correction mesh corresponds, e.g., an image corresponding to one camera of a left and right camera pair of a sector of the camera rig.

The correction mesh shown in FIG. 19 can be expressed in terms of a set of nodes and offset information. The U and V coordinates, where U corresponds to what would normally be the X axis and V corresponds to what would normally be the Y axis, included for a node in the correction mesh set of information serve as a node identifier to identify a corresponding node in the regular mesh of FIG. 20 which occurs at the indicated U and V coordinates. Thus, a U coordinate and V coordinate of a node in the regular mesh shown in FIG. 20 can be used to identify a corresponding node in the correction mesh with offset information included in the set of correction mesh information indicating how much the U coordinate and V coordinate of the corresponding node shown in FIG. 20 should be altered to result in the location of the node in FIG. 19. The offset information for a node can be considered "correction information" since it indicates how much the node position must be corrected or adjusted to place it at the position of the corresponding node in the regular UV map shown in FIG. 20.

While FIG. 19 shows a single correction mesh, it should be appreciated that the correction mesh is camera dependent and thus separate sets of mesh correction information are provided for each camera which captures images with separate correction meshes being generated for each of the left camera and right camera of a stereoscopic camera pair. Since the regular UV map shown in FIG. 20 does not depend on the camera lens distortions, the same UV map maybe, and in some embodiments is, used for both left and right eye images of a stereoscopic image pair.

Figure 21:
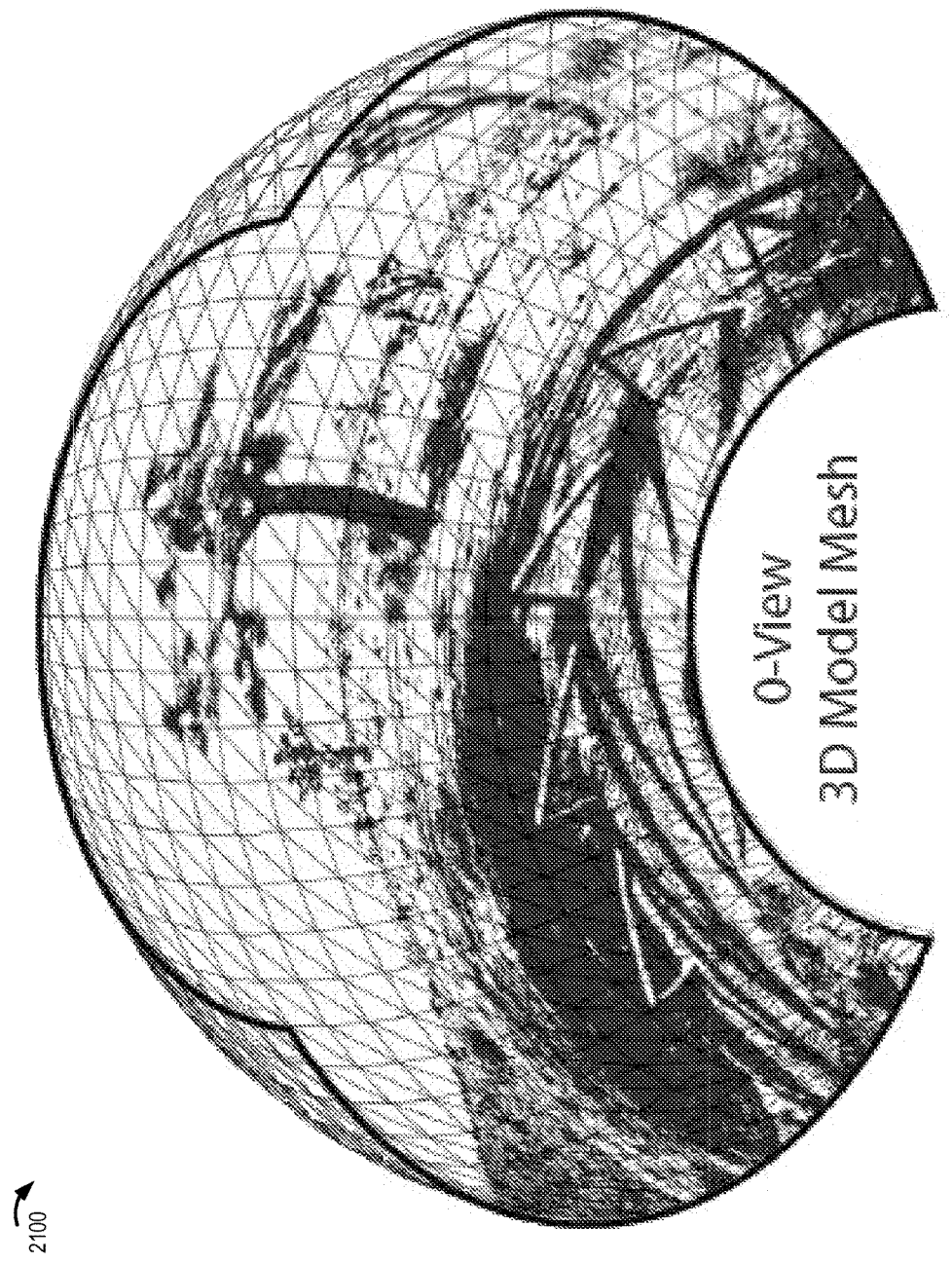
FIG. 21 shows an environmental mesh model corresponding to one sector of the camera rig with one of the images shown in FIG. 20 applied, e.g., projected, onto the environmental mesh.

Once the decoded distorted image corresponding to a left or right eye camera has been corrected to remove the distortions introduced by the particular camera lens which captured the image, it can be applied to the 3D model of the environment using the regular UV map which maybe and in some embodiments is the same for the left and right eye image views as part of a rendering step as represented in FIG. 21.

However it should be appreciated that in some embodiment the generation of one or more distortion corrected images is skipped with the rendering image using the information about the location of nodes in the regular UV map along with the offset information included in the set of correction mesh information to directly map from a decoded distorted camera view to the 3D mesh model. Accordingly, the generation of a distortion corrected image while shown to facilitate an understanding of the invention is in no way critical to the invention and can be skipped with distortion correction and mapping to the 3D module being performed in one processing operation.

Referring once again to FIG. 10, with the correction mesh having been generated in step 1004 for a camera based on calibration information, operation proceeds to step 1012 which is a return step.

As should be appreciated, the calibration process shown in FIG. 10 will be preformed for each camera of camera rig 102 and/or other camera rigs which may be used to support streaming of stereoscopic content with a correction mesh being generated and stored for each camera. For example, in a stadium multiple camera rigs may be positioned at different locations. The camera rig used to supply images to a playback device may be switched on the server side, e.g., based on an editors decision as to what camera position provide the best view, e.g., of the main action, at a given time or may be switched by a user of a playback device signaling a desire to switch from a current camera rig view at an event to viewing the action from the perspective of a different camera rig. In either case when a content server switches the camera rig and/or camera pair being used to supply content to the playback device, it may and often does signal to the playback device that it should switch from using the set of correction information corresponding to the camera pair that was supplying content to using the mesh correction information corresponding to the new camera pair which will supply content from the new camera position to which the switch is made.

While a correction mesh may include information for all nodes in the UV map, in some cases the lens distortions may not require corrections with regard to one or more nodes in the UV map. In such a case the set of correction mesh information transmitted to the playback device may omit information for nodes which occur in the distortion correction mesh at the same location as the UV map corresponding to the portion of the 3D model to which images captured by the camera to which the correction mesh information correspond.

In step 906 after the call to the calibration subroutine 1000 the correction mesh, e.g., set of correction mesh information in the form of node positions and offset values, produced by the process is stored in memory and made available to the streaming device 114 to be supplied to a playback device with or prior to image content captured by the camera to which the particular correction mesh information corresponds.

Operation proceeds from step 906 to step 906 which is an optional step. In step 908 a 3D environmental map is generated by taking distance measurements of the environment from the location of the camera rig. Such distance measurements may be made using, e.g., LIDAR and/or other distance measurement techniques.

The environmental measurements may precede an event and stored in memory for future use and/or distribution. For example, an arena may be measured once and then the measurements used when streaming or supplying content captured at numerous different events for the same venue, i.e., arena.

In the absence of such measurements the environment maybe, and in some embodiments is, presumed by the playback device to be a sphere of a default size. The environmental measurements provide information on the distance from the camera rig and thus cameras mounted in the rig 102 to various points in the environment which correspond to points of a grid mesh used to simulate the environment. Based on the distance measurements grid points in the simulated mesh environment may be moved further out or closer in to the center point which servers as the viewers location. Thus, the mesh grid used to reflect the environment which is modeled using triangles and a sphere as the default shape can be stretched or otherwise altered to reflect the actual measured shape of an environment being simulated.

In step 910, which is performed when step 908 is performed, the information representing the environment measured in step 908 is stored. The stored environmental measurement information includes distances form the camera rig 102 to walls or other surrounding objects which can be used to adjust the distances to points in the mesh used to simulate the environmental shape surrounding the camera rig 102 used to capture the images to be streamed or otherwise communicated to a playback device.

Figure 11:
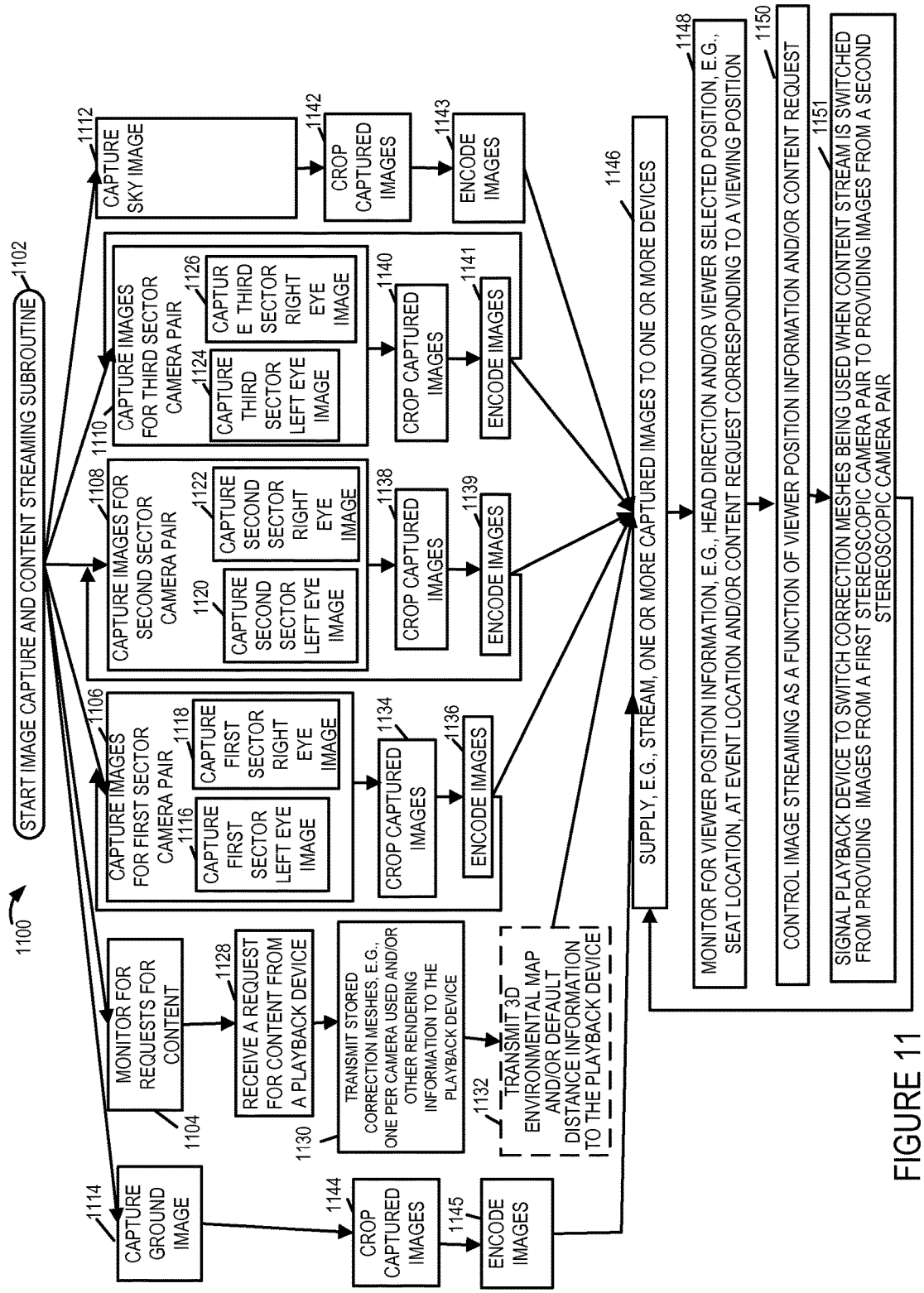
FIG. 11 illustrates an image capture and content streaming subroutine which may be called by the flow chart shown in FIG. 9.

With the cameras of rig 102 calibrated and environmental information collected, in cases were it will be used, operation proceeds to the image capture and content streaming subroutine, e.g., the routine 1100 shown in FIG. 11 via go to step 912. Image capture will proceed for the duration of an event being captured with real time streaming being supported during the event in some embodiments and non-real time content distribution and streaming being supported after completion of an event.

FIG. 11 which illustrates an image capture and content streaming subroutine, which may be called by the flow chart shown in FIG. 9, will now be discussed in detail. The method 1100 shown in FIG. 11 starts in step 1102 when the routine is called, e.g., after camera calibration when it is time to capture images, e.g., images corresponding to an event such as a sporting event or music performance.

From start step 1102 operation proceeds along a plurality of paths, the paths bringing with steps 1114, 1104, 1106, 1108, 1110, 1112, which maybe performed in parallel and, optionally, asynchronously.

To facilitate an understanding of the image capture process reference will now be made to the exemplary camera rig shown in FIG. 13. The camera rig 1300 can be used as the rig 102 of the FIG. 1 system and includes a plurality of stereoscopic camera pairs each corresponding to a different one of three sectors. The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair. Second stereoscopic camera pair 1305 corresponds to a second sector and includes left and right cameras 1306, 1308 while the third stereoscopic camera pair 1309 corresponds to a third sector includes left and right cameras 1310, 1312. Each camera is mounted in a fixed position in the support structure 1318. An upward facing camera 1314 is also included. A downward facing camera which is not visible in FIG. 13 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event.

The output of the cameras of the rig 1300 are captured and processed by the method of FIG. 11 which will now be discussed further. Image capture steps shown in FIG. 11 are normally performed by operating a camera of the camera rig 102 to capture an image while encoding of images is performed by encoder 112 with responses to streaming requests and streaming of content being preformed by the streaming server 114.

In the first path of FIG. 11 which relates to downward image capture and processing, in step 1114 an image is captured of the ground, e.g., beneath rig 102. This may happen prior to rig placement or during the event if the rig includes a downward facing camera. From step 1114 operation proceeds to steps 1144 where the captured image is cropped prior to encoding in step 1145. The encoded ground image is then stored pending a request for content which may be responded to by supplying one or more encoded images in step 1146 to a requesting device.

The second processing path shown in FIG. 11, which starts with step 1104, relates the processing and responding to requests for content. In step 1104 monitor for request for content occurs, e g., by content server 114. In step 1128 a request for content is received from a playback device, e.g. device 122 located at customer premise 106.

In response to the content request the playback device is provided with information to be correct distortions in streamed images in step 1130 and/or other rendering related information. The distortion correction information transmitted in step 1130 may be in the form of one or more distortion correction meshes, e.g., one for each camera which may supply images in a content stream to the playback device. A distortion correction mesh information maybe and in some embodiments is transmitted to the playback device with a custom distortion mesh being provided in some embodiments for each camera of the rig 102 which supplies images. Thus, in the case of a rig with 3 sector pairs of camera a top pair of cameras and a downward facing pair of cameras a total of 10 distortion correction meshes would be communicated to the playback device for use on images captured by the rig's cameras, e.g., with one mesh for each camera. The distortion correction mesh information may, as discussed above, include information corresponding to a UV map corresponding to the area captured by the camera with node locations being identified and offset information being provided on a per node basis in the set of distortion correction information. For nodes in the distortion correction mesh which match the node location in the corresponding UV map, information may be omitted when there is no offset to be specified because the nodes occurs in the distortion correction mesh at the same location as in the UV map.

Figure 18:
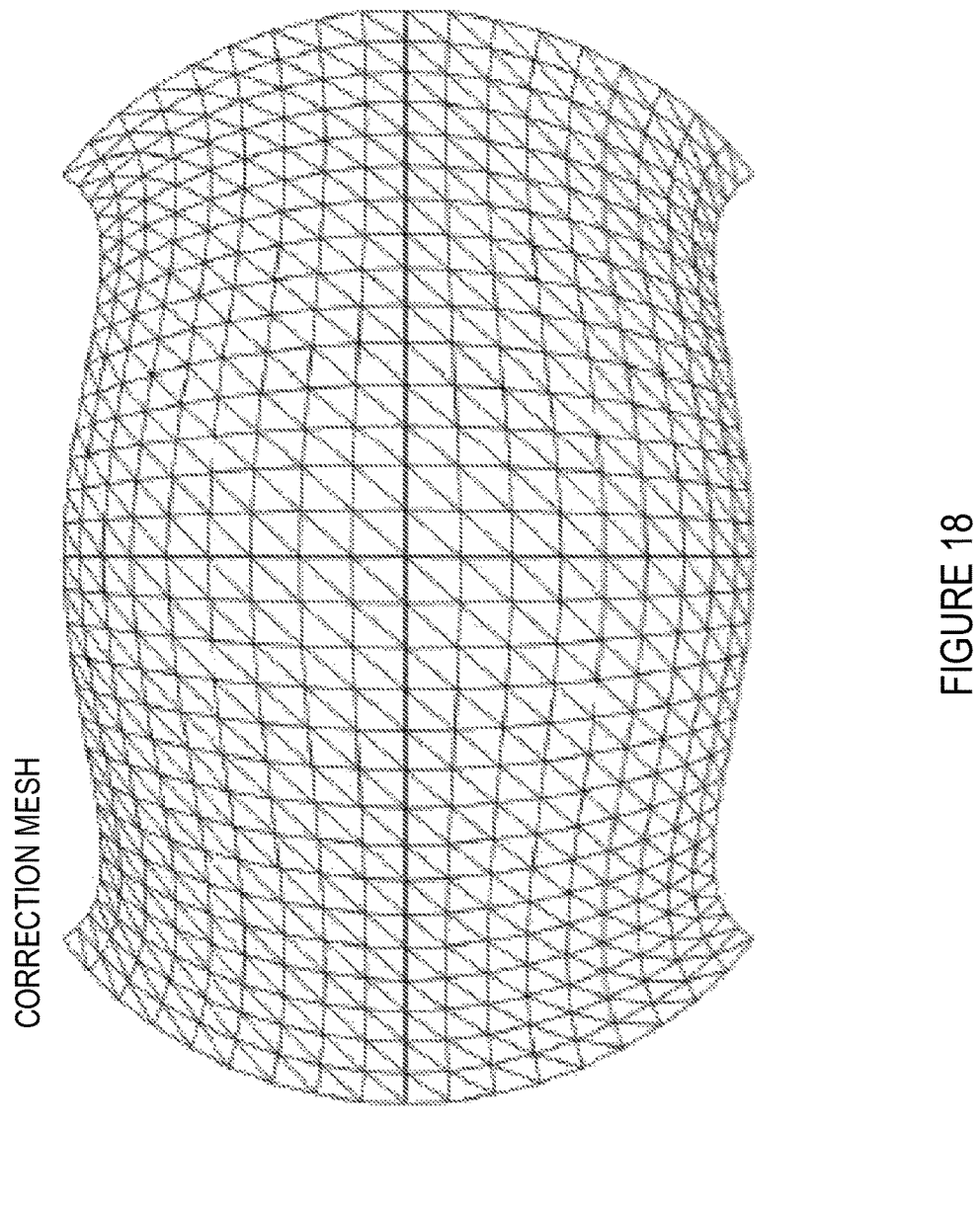
FIG. 18 shows an exemplary correction mesh that may be generated for an individual camera and transmitted to a playback device to be used in correcting for distortions into a captured image transmitted to the playback device before the image is further processed for mapping and display on a portion of the 3D simulated mesh environment to be presented to the user.

FIG. 18 shows an exemplary correction mesh 1800 which can be used compensate for distortions introduced by a corresponding camera with a fish eye lens. Since the distortion correction meshes are camera dependent and normally do not change for the duration of an event, they need not be sent repeatedly but can be buffered and/or otherwise stored by a playback device before or at the start of content streaming associated with an event. It should be noted however that in cases where the camera rig used to supply images may vary during the event, e.g., because different camera locations provide better view of the main action, distortion correction information for cameras of multiple different camera rigs may be transmitted to the playback device with the playback device using the distortion correction information corresponding to the camera whose images are decoded and being mapped to the 3D model at a given time. The playback device may be signaled which distortion correction map to use at a given time for particular transmitted images received by the playback device and/or the playback device may determine which set of distortion correction information to use based on the users viewing direction and which camera rig is providing the content at a given time which may be know from a user selected camera position. For example, the user may selected to view the event from a center field position in which case the camera rig at center field will supply the images to be used for rendering.

From step 1130 operation proceeds to step 1132 which is performed in cases where an environmental map was generated and/or other environmental information which may be different from a predetermined default setting is supplied to the playback device to be used to simulate the measured 3D environment during playback.

Thus, via steps 1128 and 1130 a playback device requesting content is provided the information needed to simulate the 3D environment and/or with other information which may be needed to render and simulate the 3D environment such as mask information and/or information indicating which camera feeds and/or image streams correspond to which portions of the 3D environment to be simulated.

Figure 14:
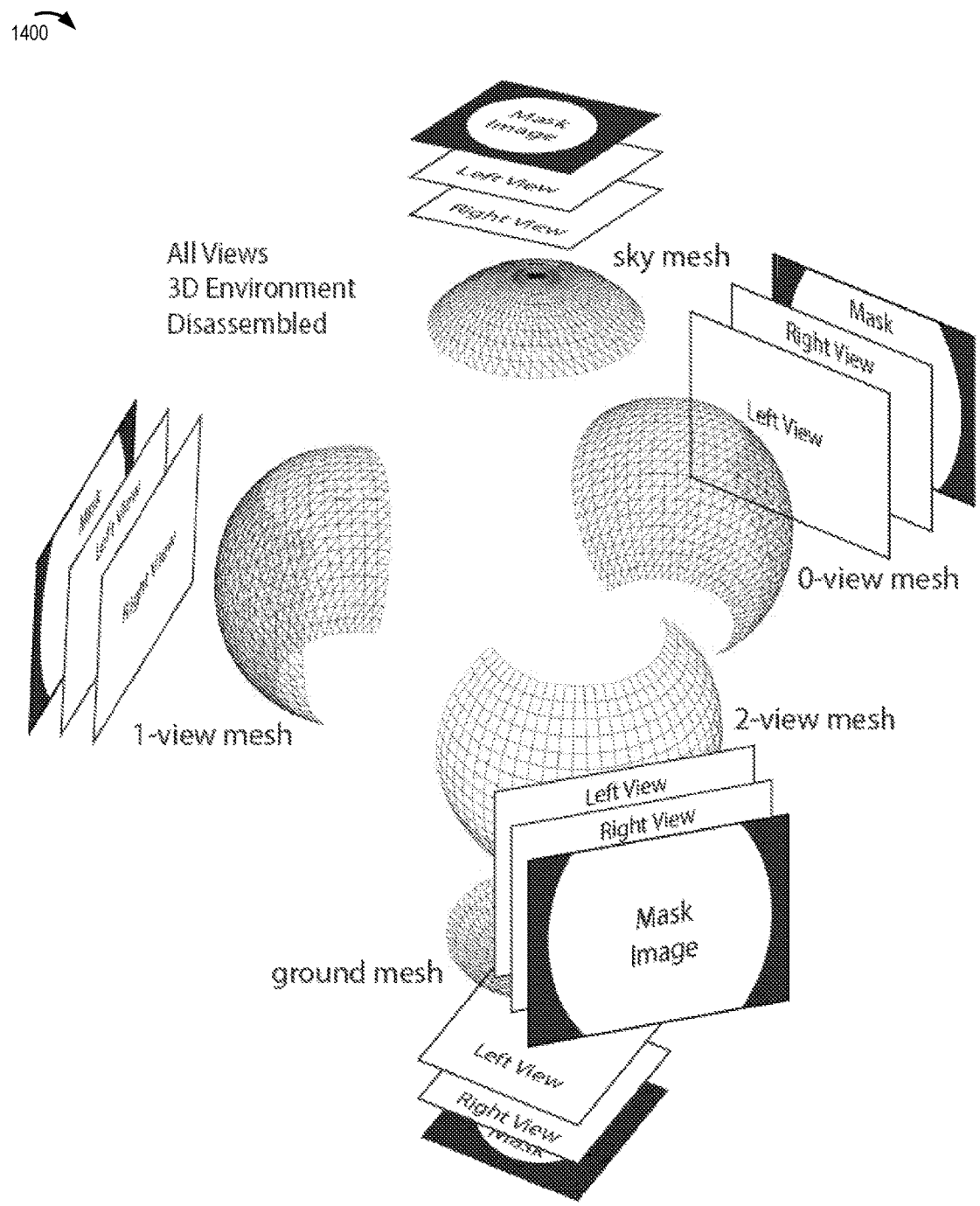
FIG. 14 shows an how 5 different environmental mesh maps, corresponding to different camera views, can be combined to create a complete spherical view/environment onto which captured images can be projected as part of a playback operation.

Mask and/or image combining information which may be communicated in step 1128 in addition to the correction meshes includes information enabling coming of image portions as shown in FIG. 14. The mask information may be in the form of a set of alpha values with an alpha value, in some embodiments, being provided for each image segment to control whether a portion of an image to which the mask is applied will contribute to the image displayed to the 3D model or not.

When the FIG. 13 camera rig is used each of the sectors corresponds to a known 120 degree viewing area with respect to the camera rig position, with the captured images from different sector pairs being seamed together based on the images know mapping to the simulated 3D environment. While a 120 degree portion of each image captured by a sector camera is normally used, the cameras capture a wider image corresponding to approximately a 180 degree viewing area. Accordingly, captured images may be subject to masking in the playback device as part of the 3D environmental simulation. FIG. 14 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 15:
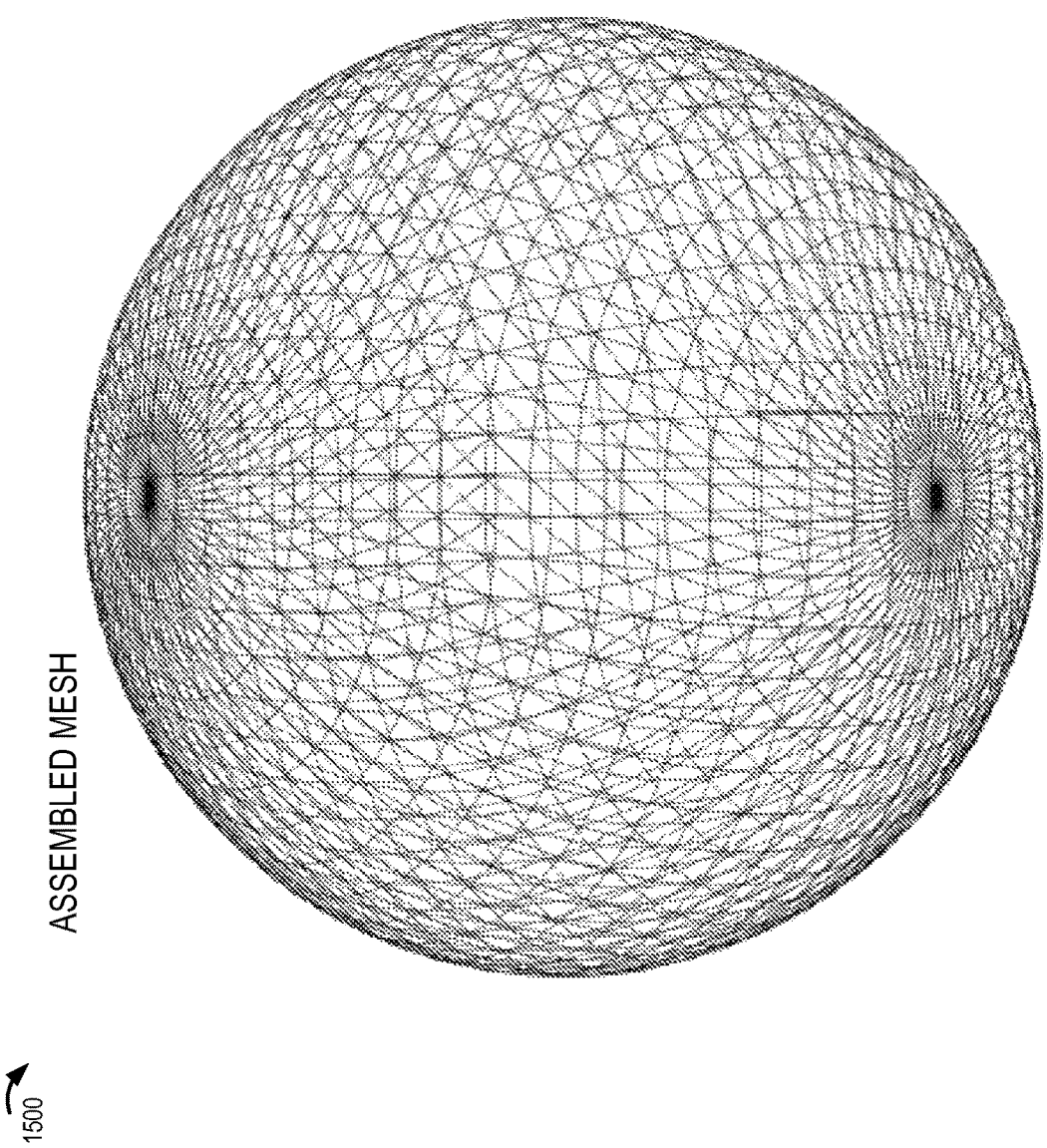
FIG. 15 shows the full assembly of 5 meshes shown in FIG. 15 to create a spherical simulated environment

When combined the overall meshes corresponding to different cameras results in a spherical mesh as shown in FIG. 15. Note that the mesh is shown for a single eye image but that it is used for both the left and right eye images in the case of stereoscopic image pairs being captured.

Mesh and masking information of the type shown in FIG. 14 can and sometimes is communicated to the playback device in step 1130. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is shown being optionally transmitted in step 1132 to the playback device. It should be appreciated that the environmental map information is optional in that the environment may be assumed to be a default size sphere in the event such information is not communicated. In cases where multiple different default size spheres are supported an indication as to what size sphere is to be used maybe and sometimes is communicated in step 1132 to the playback device.

Operation proceeds from step 1132 to streaming step 1146.

Image capture operations may be performed on an ongoing basis during an event particularly with regard to each of the 3 sectors which can be captured by the camera rig 102. Accordingly, processing paths starting with steps 1106, 1108 and 1110 which correspond to first, second and third sectors of the camera rig are similar in terms of their content.

Figure 16:
FIG. 16 shows a left eye view image and a right view image captured by left and right eye cameras, with fisheye lenses, corresponding to a sector of the camera rig shown in FIG. 13.
Figure 17:
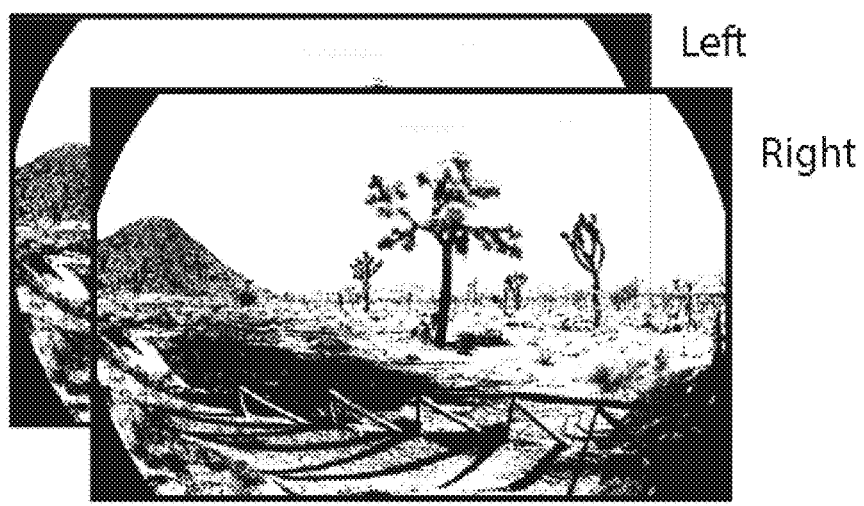
FIG. 17 shows how the left and right eye view images of FIG. 16 may be cropped prior to encoding and transmission to one or more playback devices.

In step 1106, the first sector pair of cameras is operated to capture images, e.g., a left eye image in step 1116 and a right eye image in step 1118. FIG. 16 shows an exemplary image pair that may be captured in step 1106. The captured images are then cropped in step 1134 and encoded in step 1136 prior to being made available for streaming in step 1146. FIG. 17 shows an exemplary result of cropping the FIG. 16 images as may occur in step 1134.

The image capture, cropping and encoding is repeated on an ongoing basis at the desired frame rate as indicate by the arrow from step 1136 back to step 1106.

In step 1108, the second sector pair of cameras is operated to capture images, e.g., a left eye image in step 1120 and a right eye image in step 1122. The captured images are then cropped in step 1138 and encoded in step 1139 prior to being made available for streaming in step 1146. The image capture is repeated on an ongoing basis at the desired frame rate as indicate by the arrow from step 1139 back to step 1108.

In step 1110, the third sector pair of cameras is operated to capture images, e.g., a left eye image in step 1124 and a right eye image in step 1126. The captured images are then cropped in step 1140 and encoded in step 1141 prior to being made available for streaming in step 1146. The image capture is repeated on an ongoing basis at the desired frame rate as indicate by the arrow from step 1141 back to step 1110.

In step 1112 a sky image is captured by a top camera of the camera rig 102. The image is then cropped in step 1142 and encoded in 1143 prior to being made available for streaming in step 1146. The capture of ground and sky images may be performed on an ongoing basis if desired as with the sector image capture and also may be captured in stereo, e.g., with left and right eye images being captured. In the FIG. 11 example sterol image capture of the sky and ground view is avoided for data reduction purposes since these images tend to be less important in many cases than the forward frontal view which may correspond to a front 120 sector of the camera rig. However in some embodiments stereo sky and ground views are captured and updated in real time.

Note that while multiple camera views are captured corresponding to different sectors the image capture rate need not be the same for all sectors. For example, a front facing sector corresponding to e.g., the main playing field may capture images at a fast frame rate that the cameras corresponding to other sectors and/or the top (sky) and bottom (ground) views.

In step 1146 the requesting content playback device is supplied with one or more captured images which the playback device can then process and use to simulate a 3D environment.

In some embodiments where content is supplied in response to a request for content, step 1146 is performed on a per requesting device basis, e.g., in response to a playback device transmitting a request for content stream. As a result, different devices may be supplied with different content corresponding to different camera sectors or even different camera rigs depending on the viewers head position or selected viewing position at the event. Such viewing position information is monitored for in step 1148 and may be received from the playback device on a periodic basis, when there is a change in head position, or a change in the user selected viewing position, e.g., mid field or end zone viewing position. In other embodiments content is broadcast or multicast with devices attaching to the content stream including the content they want to access at a given point in time, e.g., because of a user's current head position or because of a current user selected camera position alone or in combination with head position information. Thus, in the case where head position and/or information about a user selected camera position is communicated to the content server the content server may stream image content based on the information from an individual user's playback device. In the broadcast case, the server may stream content corresponding to different camera pairs and/or camera rigs and the playback device can select which broadcast or multicast content stream to receive and process at any given time. Mesh correction information maybe included in a content stream for cameras which supply images transmitted in a content stream or out of band over a control or other channel which can be used by playback devices to receive information relating to rendering of images that maybe received in one or more content streams available to the playback device.

In step 1150 image streaming is controlled, in embodiments where a requesting device provides viewing position to the server, as a function of viewer head position information. For example if a user changes from viewing sector 1 to sector 2 of an environment, step 1146 as a result of the change made in step 1150 may be altered to stream content corresponding to sector 2 instead of sector 1 to the user. Note that while the images corresponding to all sectors may be streamed to a user, from a bandwidth utilization perspective limiting the number of streams to those required to support the indicated viewing angle can be desirable from a bandwidth management and utilization perspective. In the case where multiple content streams are broadcast or multicast and the playback device selects which stream to attach to, e.g., receive, step 1150 need not be performed.

As should be appreciated the camera rig used to supply content at a particular point in time may be switched, e.g., as the main point of action associated with a live event moves from the field of view corresponding to one camera rig to the field of view of another camera rig. For example, as football action moves from one end of the stadium to the other end, the broadcaster may choose to supply content from different camera rigs so that the best view is broadcast throughout the game. In such cases the broadcaster may control a switch as to which camera rig provides content in a content stream being transmitted. When a switch in cameras used to supply content in a content stream is made, it is useful to signal a change to the playback devices receive the content stream so that they will use the correction mesh information corresponding to the camera supplying images at a given time. In step 1151 a signal is sent to the playback device indicating that the playback device should switch which correction meshes are to be used so that the correction meshes used will match the source cameras providing the images being streamed. For example the playback device is signaled to switch from using correction meshes corresponding to a first camera pair to using correction meshes corresponding to a second camera pair when the server switches from streaming images corresponding to the first camera pair to streaming images to the playback device corresponding to the second camera pair.

Receiving of feedback information from the playback device, in embodiments where such information is provided to a server, and streaming of images will continue for the duration of the event or, in the case of unicast content delivery, until termination of a session with the playback device.

The ongoing process of delivering content and providing information about which correction meshes to use is represented by the arrow from step 1151 returning to step 1146 to indicate that content streaming may continue on an ongoing basis with steps 1146 to 1151 being performed repeatedly as images are captured and streamed as image capture, encoding and streaming steps are repeated on an ongoing basis.

Having explained the image capture, encoding and transmission process which is performed in some embodiments by system 104 operation of an exemplary playback device, e.g., device 122 or device 800 shown in FIG. 8 will now be described with reference to FIG. 12.

Figure 12:
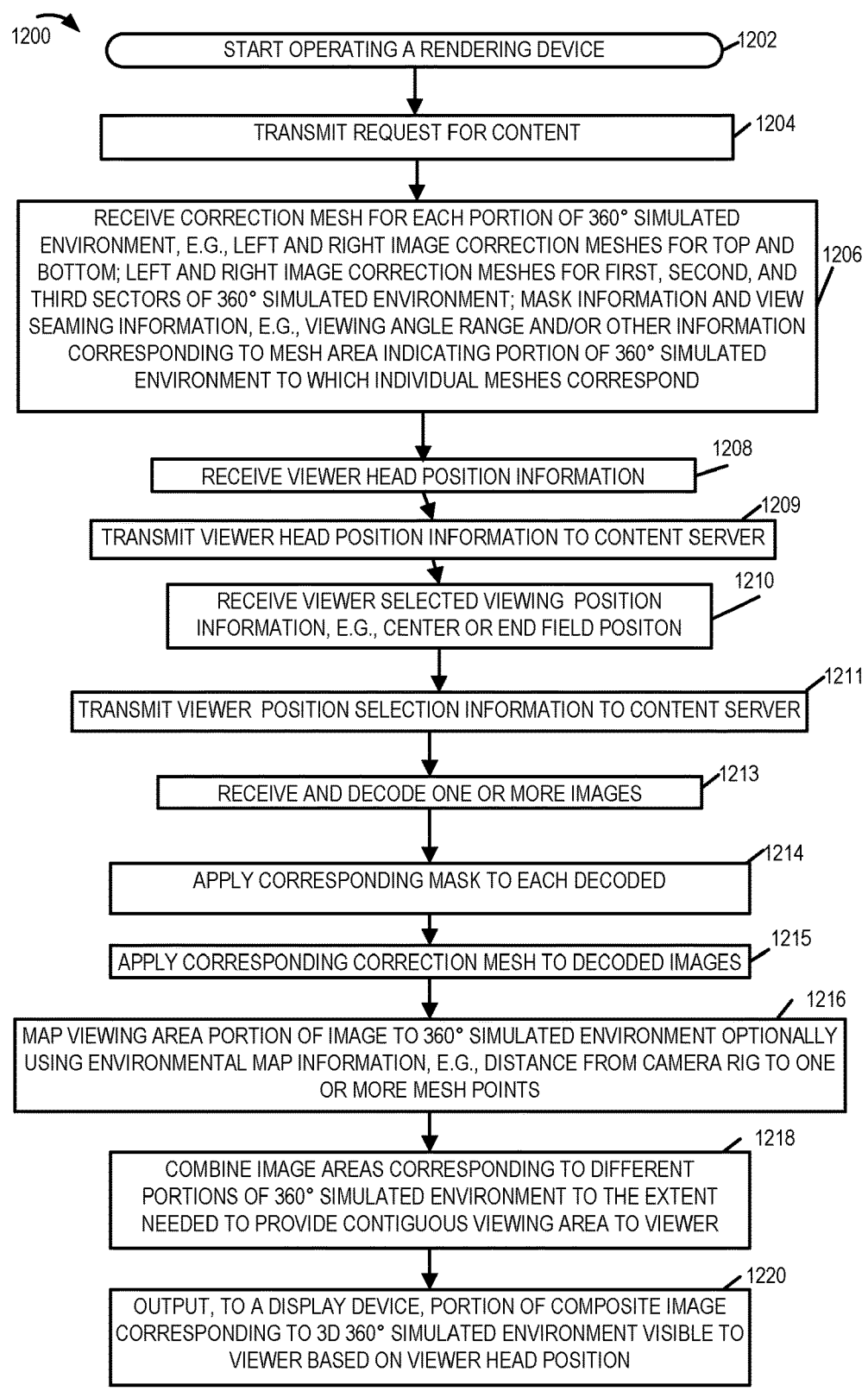
FIG. 12 illustrates a method of operating a playback device or system, which can be used in the system of FIG. 1, in accordance with one exemplary embodiment.

FIG. 12 illustrates a method 1200 of operating a playback device or system, which can be used in the system of FIG. 1, in accordance with one exemplary embodiment. The method 1200 beings in start step 1202. In step 1204 the playback device transmits a request for content, e.g., to the streaming server of FIG. 1. The playback device then receives in step 1206 various information including the information which maybe and sometimes is transmitted in steps 1128, 1130 and 1132 of FIG. 11. For example in step 1126, the playback device may and sometimes does receive information specifying a correction mesh for each of the each camera from which an image portion may be received, in addition image mask information to be used with regard to a camera output may be received along with other information such as information on the environment to be simulated, e.g., an environmental map and/or information about environmental mesh portions corresponding to different camera outputs that should or can be used to generate a simulated 3D environment. Thus, in step 1206, the playback device may receive the mesh and mask information illustrated in FIG. 14 along with correction meshes for each camera such as the exemplary correction mesh shown in FIG. 18.

The information received in step 1206 can be stored in memory for use on an as needed basis.

Operation proceeds from step 1206 to step 1208 wherein viewer head position is received, e.g., from the head mounted display attached to the playback device or the head position is determined by the playback device visually or otherwise tracking head position. In step 1209 the view head position is transmitted to the content sever to provided it with information that can be used to select the appropriate camera images to be streamed given the viewers head position.

in step 1210 a viewer selected head position is received by the playback device, e.g., via a user control input. This input maybe received in embodiments were a user is allowed to select between a plurality of different event viewer positions, e.g., a mid field viewing position and one or more end field or goal viewing positions, e.g., where camera rigs are located.

In step 1211 the viewer selected position is communicated to the server. Steps 1208 and 1209 are repeated periodically or whenever there is a change in viewer head position to report. Steps 1210 and 1211 can be performed periodically but are normally performed under user control as a user makes a decision that he or she wants to switch to a different position, e.g., corresponding to a different seat at a sporting event or concert.

It should be appreciated that steps 1209 and 1211 provide the server with information which can be used by the server to select a subset of camera output streams to supply to the playback device in order to conserve bandwidth and avoid having to transmit all the camera outputs to the playback device.

In step 1213 which is performed on an ongoing basis, encoded images corresponding to one or more cameras of the rig 102 are received and decoded to produce exemplary decoded images, e.g., left and right eye images of a sector such as those shown in FIG. 17.

Operation proceeds from step 1214 to step 1215 in which the mask corresponding to the decoded image is applied to decoded image. Masks which may be applied are shown in FIG. 14 with the mask being applied depending on the portion of the 3D environment to which the image being subject to masking corresponds. After masking in step 1215 the correction mesh corresponding to the decoded image is applied to create a corrected image. FIG. 19 shows an exemplary application of the correction mesh shown in FIG. 18 to an image as part of a transform operation which is used to reverse or compensate for the distortions introduced by the camera which captured the image being processed.

Figure 20:
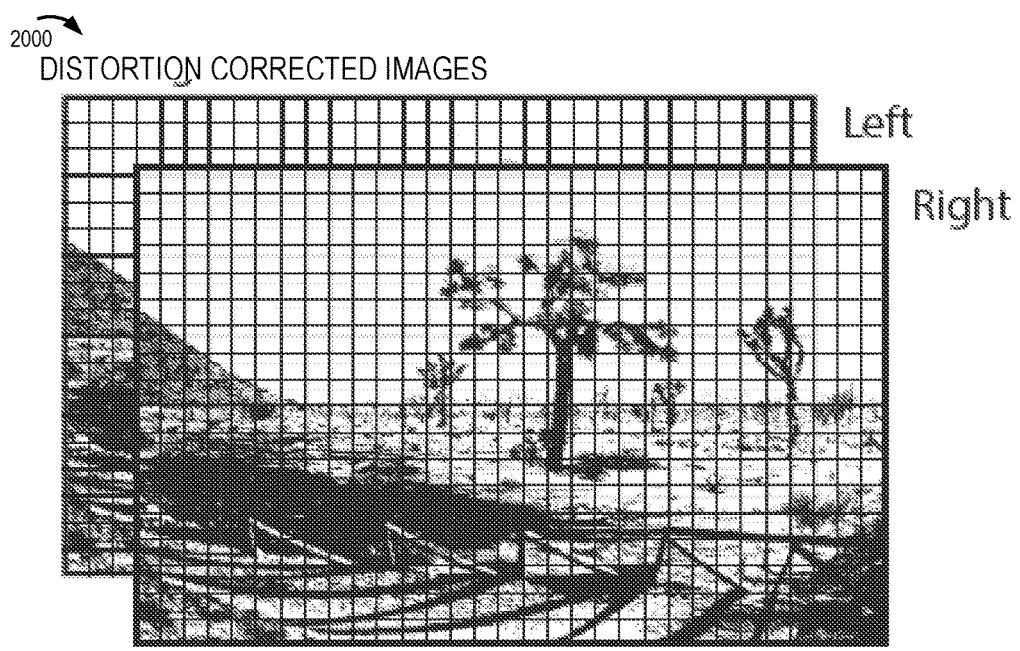
FIG. 20 shows left and right eye image pairs corresponding to a sector of the camera rig shown in FIG. 13 after correction by individual corresponding correction maps.

FIG. 20 shows the result of applying the correction mesh to the image shown in FIG. 19. As should be appreciated correction meshes will be applied to both the left and right eye images of a stereoscopic image pair. Accordingly, in FIG. 20 it is shown that both images of a pair will have been corrected, e.g., by using correction meshes corresponding to the left and right eye cameras, respectively, used to capture the images.

After correction of the decoded images, in some embodiments the relevant portion of the corrected image is mapped to the corresponding viewing area portion of the 360 degree simulated environment. The mapping is performed for the left eye image and the right eye image to generate separate right and left eye images which can be displayed to provide a 3D viewing experience. The mapping may, optionally, use environmental map information to distort the default environmental grid to more accurately reflect the environment from which the images were captured prior to application of the corrected images to the simulated environmental grid. It should be appreciated that while steps 1214, 1215 and 1216 are described as separate steps, where are performed for the left and right eye images, they can be combined into a single rendering operation in which case the rendering engine uses the mask information, mesh correction information corresponding to a particular eye image, and UV map information indicating the location of nodes in an uncorrected UV map which is to be used to map an image to the 3D mesh module being used. In this way by using the multiple inputs available a rendering engine can map decoded left and right eye image data directly to the corresponding portion of the 3D mesh module without having to generate a separate corrected version of the decoded left and right eye images. This allows for portions of the images to be processed and rendered sequentially if desired. This approach is used in some embodiments with a rendering engine generating a left eye image for display from the decoded left eye image using the mask to determine which portion of the left eye image is to be mapped to the 3D model and using the combination of the mesh correction information corresponding to the camera which supplied the left eye image and a UV map to determine how the decoded left eye image is to be mapped to the 3D mesh model of the environment to generate an output left eye image. The same rendering approach is used in such embodiments to render a right eye image for display from the decoded right eye image using the mask to determine which portion of the right eye image is to be mapped to the 3D model and using the combination of the camera dependent mesh correction information for the right eye image and UV map to determine how the decoded right eye image is to be mapped to the 3D mesh model of the environment to generate a right eye output image for display. Since the mesh correction information is camera dependent, different mesh correction information is used for rendering the left and right eye images. However, since the UV map and 3D model used in rendering is not dependent on which camera captured the images being rendered the same UV map and 3D model can, and in some embodiments is, used for rendering both the left and right eye images.

In step 1120 it should be appreciated that separate left and right eye images are output in some embodiments with differences in the left and right eye images providing depth information resulting in the view of the images having a 3D viewing experience. By performing the correction for lens dependent distortions in the playback device rather than at the server streaming the content, edges are better preserved and encoding artifacts avoided as compared to implementations where images are preprocessed prior to encoding in an attempt to remove distortions introduced by the individual lenses used to capture images.

FIG. 21 illustrates mapping of an image portion corresponding to a first sector to the corresponding 120 degree portion of the sphere representing the 3D viewing environment.

In step 1216, images corresponding to different portions of the 360 degree environment are combined the extent needed to provide a contiguous viewing area to the viewer, e.g., depending on head position. For example, ins step 1218 if the viewer is looking at the intersection of two 120 degree sectors portions of the image corresponding to each sector will be seemed and presented together to the viewer based on the know angle and position of each image in the overall 3D environment being simulated. The seeming and genera-tion of an image will be performed for each of the left and right eye views so that two separate images are generated, one per eye, in the case of a stereoscopic implementation.

Figure 22:
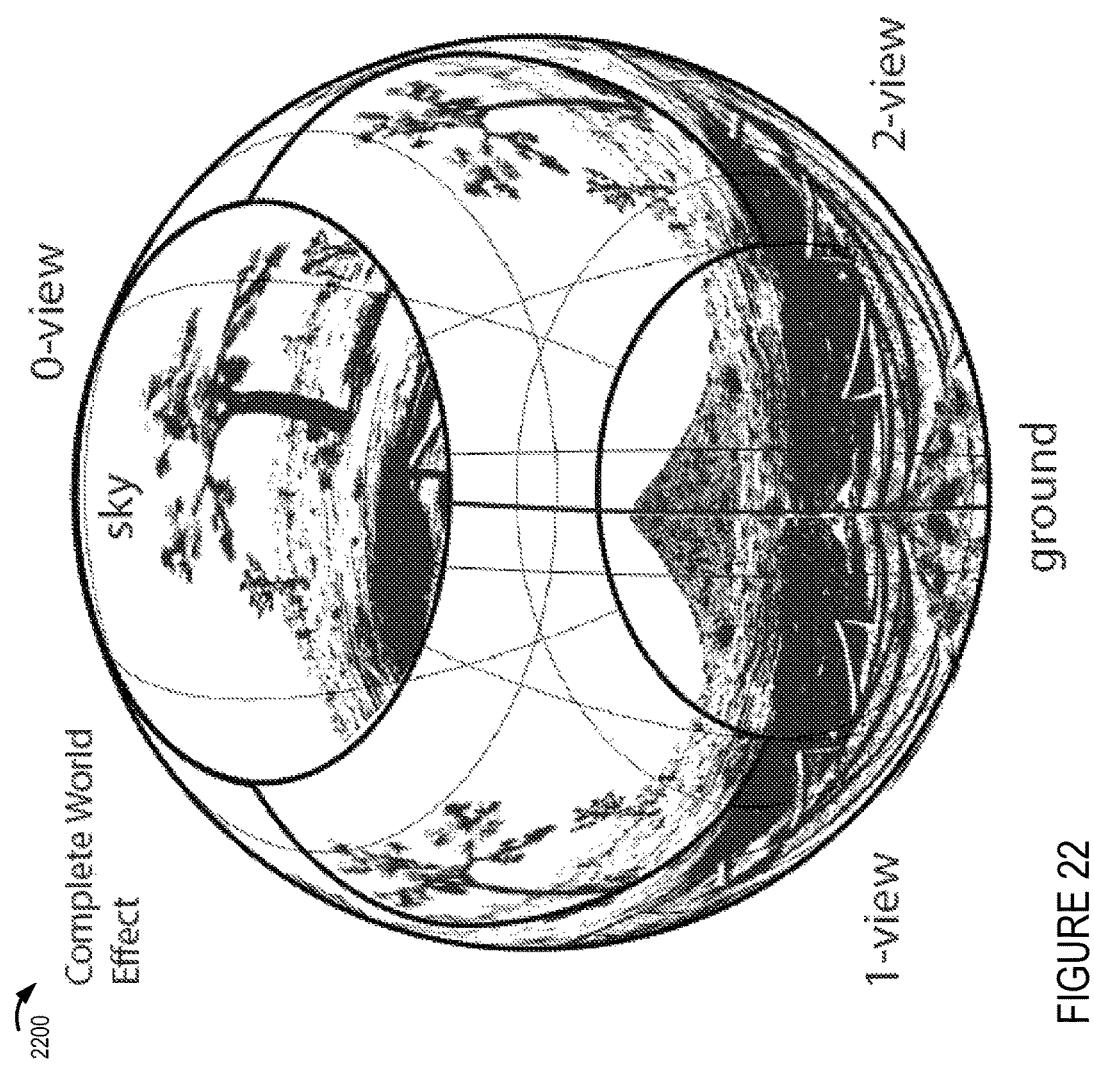
FIG. 22 shows application of images captured by cameras corresponding each of the sectors as well as the sky and ground cameras of the camera rig to simulate a complete 3D environment in the form of a sphere.

FIG. 22 shows how multiple decoded, corrected, and cropped images can be, and sometime are, mapped and seemed together to create a 360 degree viewing environment.

The mapped images are output to a display device in step 1220 for viewing by a user. As should be appreciated the images which are displayed will change over time based on the received images and/or because of changes in head position or the user selected viewer position with, in the case of stereoscopic images, separate left and right eye images being generated for separate display to a users left and right eyes, respectively.

Figures 23, 23A:
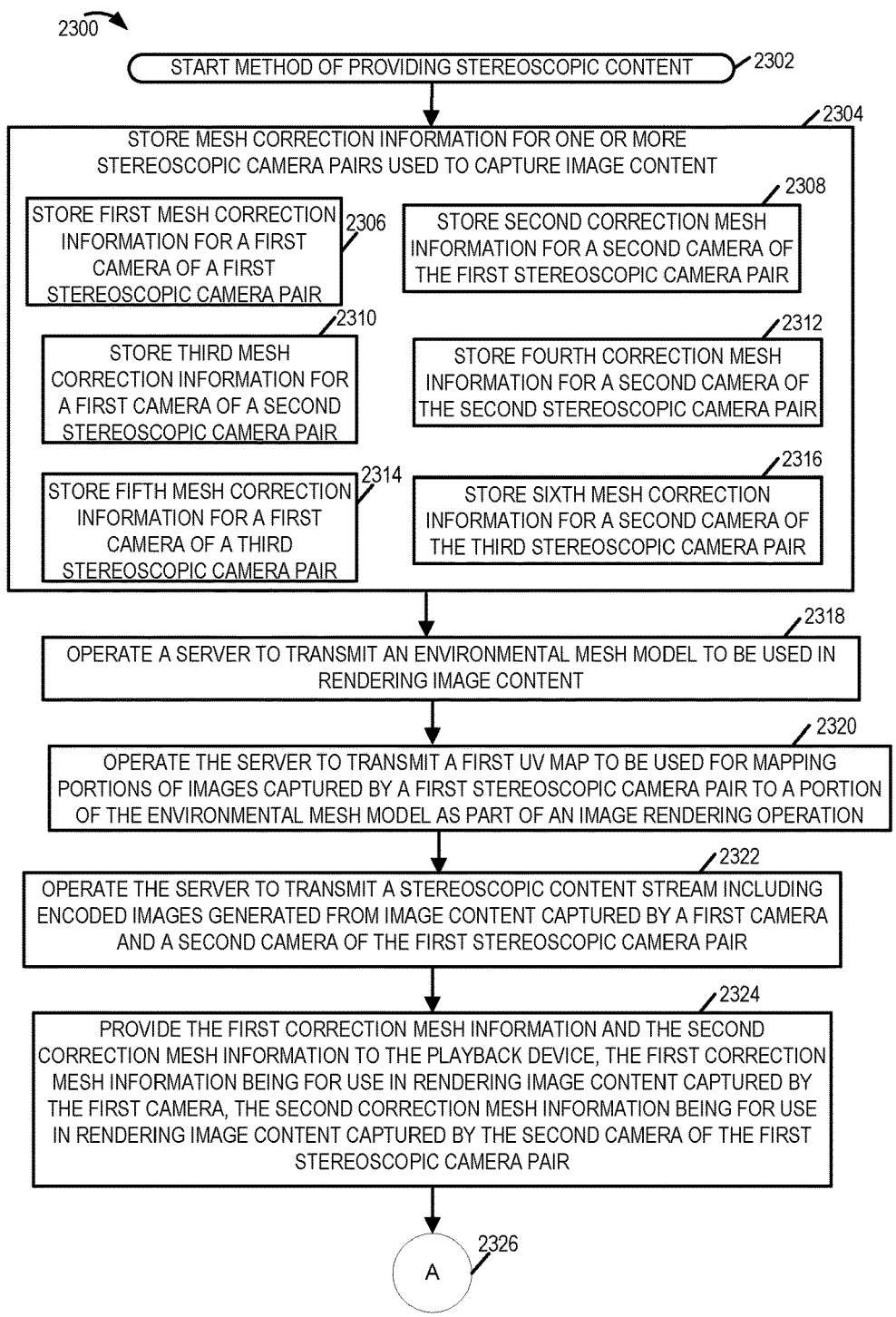
FIG. 23A is a first part of a flowchart illustrating the steps of an exemplary method of providing image content, in accordance with an exemplary embodiment.
FIG. 23 comprises the combination of FIGS. 23A and 23B illustrating the flowchart of the method of providing image content in accordance with an exemplary embodiment.
Figure 23B:
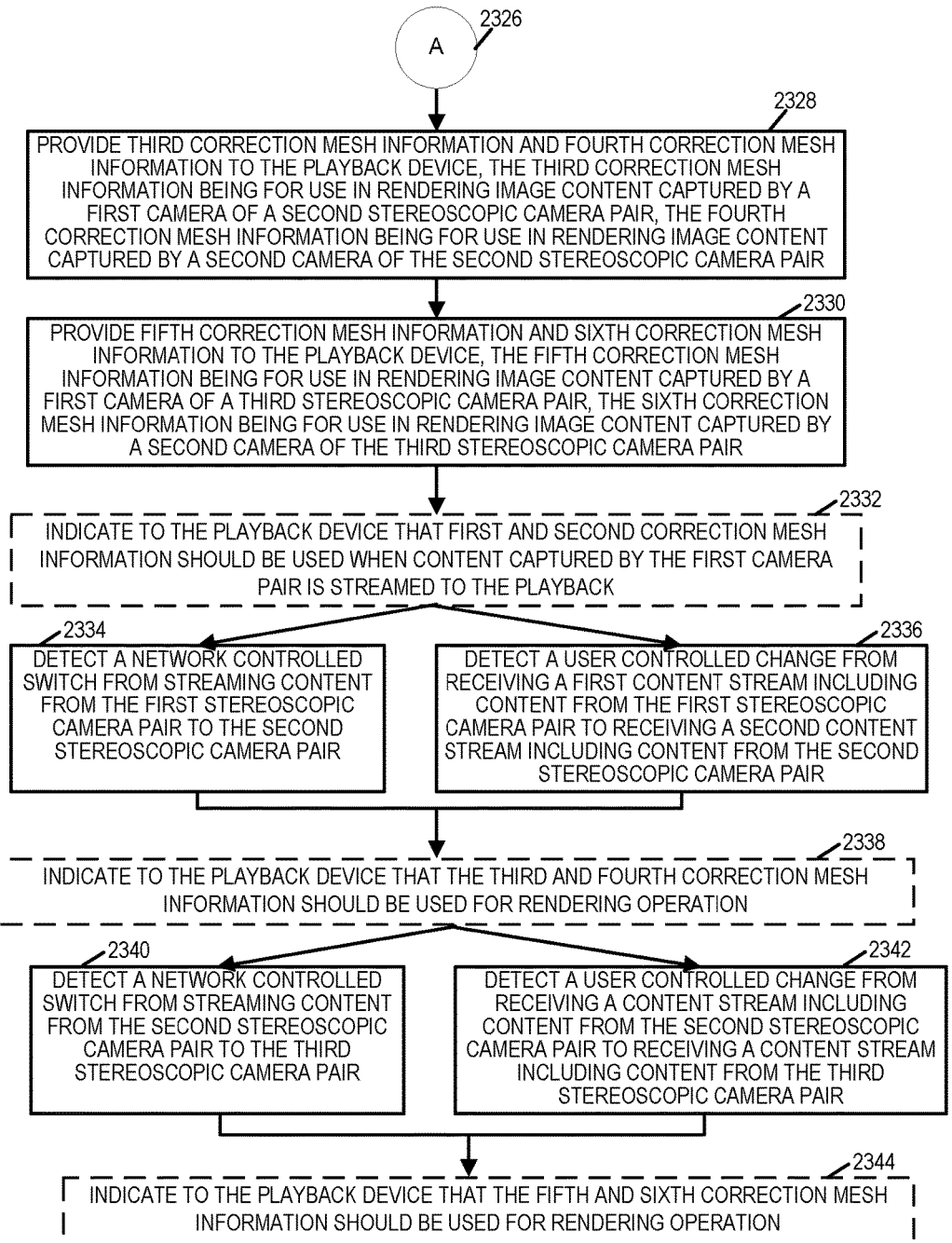
FIG. 23B is a second part of a flowchart illustrating the steps of an exemplary method of providing image content, in accordance with an exemplary embodiment.

FIG. 23 is a flowchart 2300 illustrating the steps of an exemplary method of providing image content, in accordance with an exemplary embodiment. The method of flowchart 2300 is implemented by the content delivery system 104/700 which may receive image content captured by the camera apparatus 102/1300.

The method starts in step 2302, e.g., with the delivery system being powered on and initialized. The method proceeds from start step 2302 to step 2304. In step 2304 the content delivery system 700 stores, in memory, mesh correction information for one or more stereoscopic camera pairs used to capture image content, e.g., camera pairs used in the image capture apparatus 102/1300. In some embodiments the step 2304 of storing mesh correction information includes one or more of steps 2306, 2308, 2310, 2312, 2314 and 2316. In step 2306 first correction information for a first camera of a first stereoscopic camera pair is stored. In step 2308 second correction mesh information for a second camera of the first stereoscopic camera pair. In some embodiments the first stereoscopic camera pair is part of the image capture apparatus 102/1300 and corresponds to a first direction. In step 2310 third mesh correction information for a first camera of a second stereoscopic camera pair is stored. In step 2312 fourth correction mesh information for a second camera of the second stereoscopic camera pair. In step 2314 fifth mesh correction information for a first camera of a third stereoscopic camera pair is stored. In step 2316 fifth correction mesh information for a second camera of the third stereoscopic camera pair.

Operation proceeds from step 2304 to step 2318. In step 2318 a server (e.g., streaming server 114 which may be implemented as the streaming controller 720 in system 700) is operated to transmit an environmental mesh model to be used in rendering image content, e.g., to one or more content rendering and playback devices. Operation proceeds from step 2318 to step 2320. In step 2320 the server is operated to transmit to the playback device one or more UV maps to be used for mapping portions of images captured by one or more stereoscopic camera pairs to portions of the environmental mesh model as part of a image rendering operation. In some embodiments the server is operated to transmit a first UV map to be used for mapping portions of images captured by the first stereoscopic camera pair to a portion of the environmental mesh model as part of an image rendering operation.

Operation proceeds from step 2320 to step 2322. In step 2322 a stereoscopic content stream including encoded images generated from image content captured by the first and second cameras of the first stereoscopic camera pair is transmitted to a playback device. Operation proceeds from step 2322 to step 2324. In step 2324 the content delivery system provides the first correction mesh information and the second correction mesh information to a playback device, the first correction mesh information being for use in rendering image content captured by the first camera, the second correction mesh information being for use in rendering image content captured by the second camera.

Operation proceeds from step 2324 to step 2328 via connecting node A 2326. In step 2328 the content delivery system provides the third and fourth correction mesh information sets to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the first and second stereoscopic camera pairs correspond to a forward viewing direction but different locations at an area or event location where content is being captured for streaming. Operation proceeds from step 2328 to step 2330. In step 2330 the content delivery system provides the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

Operation proceeds from step 2330 to step 2332 which is optional. In step 2332 the system 700 indicates to the playback device that the first and second correction mesh information should be used when content captured by the first stereoscopic camera pair is streamed to the playback device. The indication may be in the content stream sent to the playback device or may be via another control signal from the system 700. In some embodiments the content stream that included image content captured by the cameras of the first camera pair is used as the default content stream to be sent to one or more playback devices. However this may be changed and content streams communicating image content captured by other stereoscopic camera pairs may be provided to the playback devices at different times. In some embodiments content streams communicating image content captured by multiple stereoscopic camera pairs (e.g., e first, second, third stereoscopic camera pairs) are provided to the playback device which may then choose which stream(s) to attach to at a given time. Operation proceeds from step 2332 to steps 2334 and 2336 which are independently performed in parallel. In some embodiments steps 2334 and 2336 are two different alternatives and just one of the two steps is performed. In step 2334 a network controlled switch from streaming content from the first stereoscopic camera pair to the second stereoscopic pair is detected, e.g., indicating that content feed corresponding to second stereoscopic camera pair is to be provided to the playback device rather than from the first stereoscopic camera pair previously being provided. Operation proceeds from step 2334 to step 2338.

In step 2336 a user controlled change from receiving a first content stream including content from the first stereoscopic camera pair to receiving a second content stream including encoded content from the second stereoscopic camera pair is detected by the system 700. Operation proceeds from step 2336 to step 2338.

In step 2338 the system indicates to the playback device that the third and fourth correction mesh information should be used when content captured by the second camera pair is streamed to the playback device instead of content from the first camera pair and/or when content captured by the second camera pair is being used for rendering and playback by the playback device. In some embodiment step 2338 is optional as indicated by the dashed line box. In such embodiments no such indication as described with regard to step 2338 is provided by the system 700 upon detecting a switch such as the ones discussed with regard to steps 2334 and 2336. In such embodiments the playback device is aware of the mapping between correction mesh information and camera pairs in order to resolve as to which correction mesh information set to use for which camera pair content stream.

Operation proceeds from step 2338 to steps 2340 and 2342. In some embodiments steps 2340 and 2342 are two different alternatives and just one of the two steps is performed. In step 2340 a network controlled switch from streaming content from the second stereoscopic camera pair to the third stereoscopic pair is detected, e.g., indicating that content feed corresponding to third stereoscopic camera pair is to be provided to the playback device rather than from the second stereoscopic camera pair previously being provided. Operation proceeds from step 2340 to step 2342.

In step 2342 a user controlled change from receiving a content stream including content from the second stereoscopic camera pair to receiving a content stream including content from the third stereoscopic camera pair is detected by the system 700. Operation proceeds from step 2342 to step 2344 which is optional in some embodiments.

In step 2344 the system indicates to the playback device that the fifth and sixth correction mesh information should be used for rendering when content captured by the third camera pair is streamed to the playback device and/or when content captured by the third camera pair is being used for rendering and playback by the playback device.

Figure 24A:
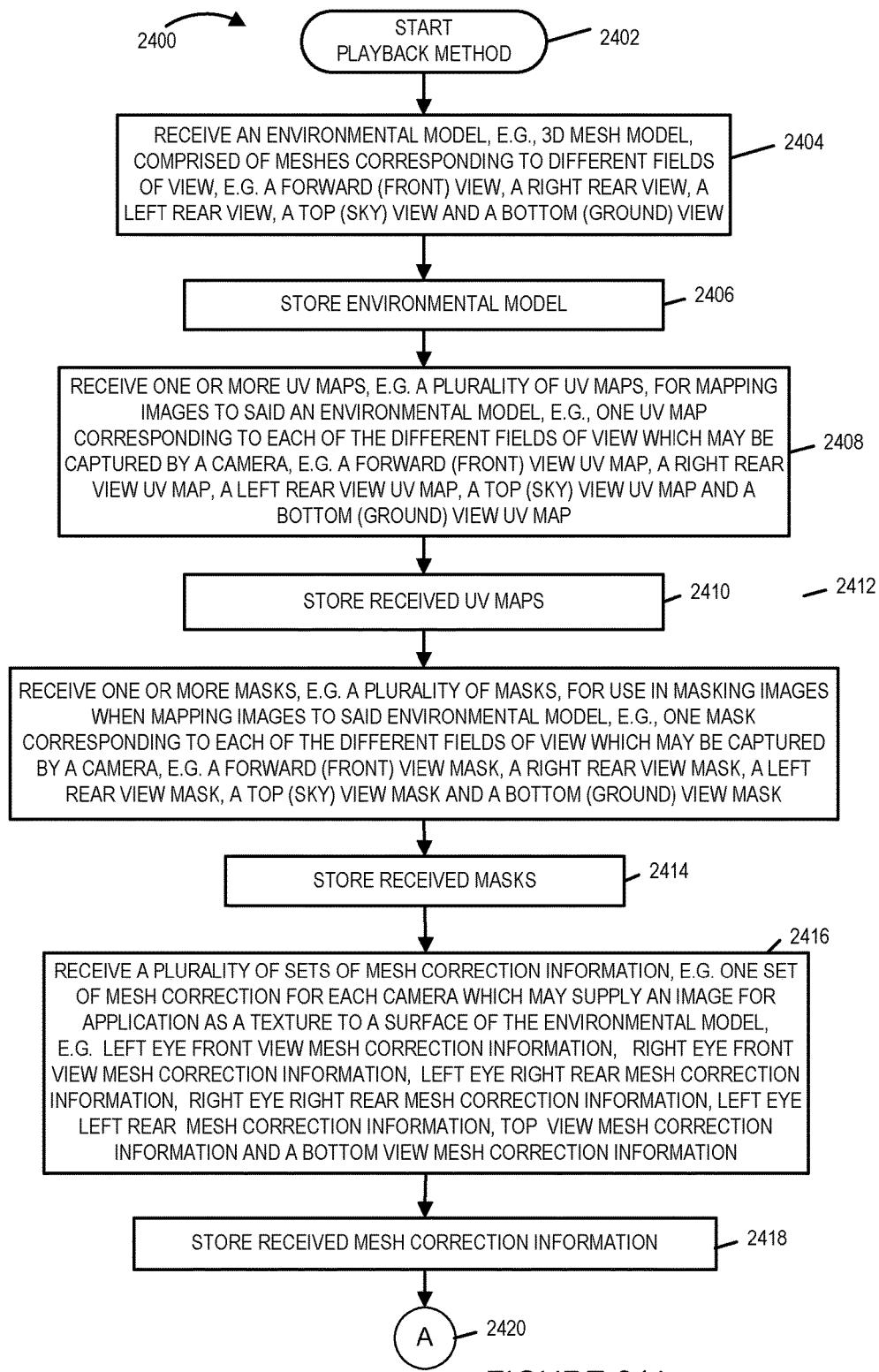
FIG. 24A is a first part of a flowchart illustrating the steps of an exemplary content playback method, in accordance with an exemplary embodiment.

FIG. 24 illustrates a method 2400 of operating a content playback device, e.g., a content playback device such as the device 800 shown in FIG. 8, e.g., to render and display left and right eye images as part a stereoscopic playback method. In the case of stereoscopic playback different left and right eye images are displayed to a user, e.g., with different portions of a display in some cases being used to present the left and right eye images in a way that that the user's left sees the left eye image and the and right eye sees the right eye image. Reference to FIG. 14 will be made during the discussion of the playback method since it facilitates an understanding of how images are generated during playback.

The method starts in step 2402, e.g., when a playback routine is executed by a processor of the playback device. Operation proceeds from step 2402 to step 2404. In step 2404 the playback device receives an environmental model, e.g., a 3D mesh model, comprising meshes corresponding to different fields of view. For example, the received mesh may and sometimes does include a mesh corresponding to a forward front view (0 view mesh), a mesh corresponding to a left rear view (1-view mesh) and a mesh corresponding to a right rear view (2-view mesh). In addition to the forward and rear view meshes the 3D model may include a sky (top) mesh and a bottom (ground) mesh model. Image content corresponding to mesh to be used may be used as a texture maybe, and sometimes is sent separately, e.g., in different streams. In step 2406 the 3D model is stored. Operation proceeds from step 2406 to step 2408 in which one or more UV maps are received by the playback device, e.g., one UV map corresponding to each mesh which forms part of the 3D model. For example, in some embodiments in step 2408 a plurality of UV maps are received to be used for mapping images to the environmental model. Each face in the UV map corresponds to a face in the 3D mesh model and is used to control the mapping of the image content corresponding to the same field of view and the UV map to the corresponding portion of the 3D model. Such mapping maybe, and in some embodiments is, implemented by a rendering engine. The UV maps are not shown in FIG. 14 but there is a UV map corresponding to each mesh portion. For example, in step 2408 a forward front view UV map, a right rear view UV map, a left rear view UV map a top view UV map and a bottom view UV map are received. Since the UV map and model are not dependent on differences which may be caused by lens defects or manufacturing tolerances between lenses of a stereoscopic pair, a single UV map can be used for both left and right eye images corresponding to a viewing direction.

In step 2410 the received UV maps are stored, e.g., for use in image rendering to facilitate wrapping of receive image portions onto a surface of the 3D model of the environment as textures.

Operation proceeds from step 2410 to step 2412. In step 2412 one or more masks are received. For example, a plurality of masks, one mask for each of the different fields of view which may be captured by a camera, are received in step 2408 in some embodiments. Consider for example FIG. 14 which shows separate masks for each of the top, forward, bottom, left rear and right rear fields of view which may be captured. The masks may be implemented as sets of alpha values which control image combining during rendering or a blending operation which may be performed. Alpha values can be set to zero for areas to be masked so that they do not contribute to the texture wrapped onto the corresponding portions of the 3D model with the image portions in the center of the frame being used as the texture to be wrapped.

The masks are stored in step 2414. Operation proceeds from step 2414 to step 2416. In step 2416 a plurality of sets of mesh correction information is received, e.g., one set of mesh correction information foe each camera which may supply an image for application as a texture to a surface of the environmental model. As explained above the mesh correction information is camera lens dependent and takes into consideration the distortions introduced by an individual camera lens. The mesh correction information may, and in some embodiments does include, UV map change information which is to be applied to make adjustments to values or information in the UV map corresponding to the same field of view as the mesh correction information being applied. Thus the mesh correction information can customize the mapping from the image captured by a camera to the 3D model that is implemented during rendering so that distortions which were not taken into consideration when the UV map was generated can be compensated for. In one embodiment in step 2416 mesh correction information. Stereoscopic camera pairs are used to capture the front, right rear and left rear view so in step 2416 a correction mesh is received for each of the six cameras used with two cameras being used per stereoscopic camera pair. Top and bottom views are not captured in stereo in some embodiments. Where top and bottom view are in stereo separate correction meshes are received for each of the left and right eye cameras used. In step 2416 only one set of top view mesh correction information and one set of bottom view mesh correction information is mentioned assuming in this particular example the top and bottom view are not captured in stereo. Thus, in step 2416 first correction information corresponding to a first camera, e.g., a left eye camera of a forward looking stereoscopic camera pair, is received. In step 2416 second mesh correction information is also received where the second mesh correction information in some embodiments corresponds the right eye camera of the forward looking stereoscopic camera pair. In step 2416 additional mesh correction information corresponding to a plurality of different camera may, and sometimes is received.

It should be appreciated that different camera rigs may be used at different times to supply images. In such a case in step 2416 mesh correction information would be received for cameras of different camera rigs. Which set of mesh correction information is used during rendering depends on which camera supplied the content being used for rending. Information on which camera supplied the image content in a content stream maybe included in the video content stream so that the playback device can identify the correction mesh corresponding to the camera which captured the image. In some embodiments a server providing content signals the playback device instructing it what correction mesh to use at a given time with the server indicating that the playback device should switch from using one set of correction information to another set of correction information when a change is made as to which camera(s) are used to supply content.

The received correction meshes are stored in the playback device step 2418. Thus in step 2418 additional mesh correction information corresponding to a plurality of different cameras can be stored with other received mesh correction information. Once the correction meshes and other information are stored the stored information can be accessed and supplied to the rendering engine on an as needed basis.

Operation proceeds from step 2418 to step 2422 via connecting node 2420. In step 2422 at least one image correspond to each field of view is received. These may be default images used to initially populate the image buffers and to generate an initial 3D view.

In step 2424 the received images are decoded and then in step 2426 the images are stored, e.g., for use in rendering operations. As images are received the initial images may be replaced with more recent images. As should be appreciated the images corresponding to different sections of the environment may be updated, i.e., received, at different rates.

Operation proceeds from step 2426 to step 2428 where a user's head position, e.g., direction of view, is determined, e.g., based on information from a sensor in a head mounted display. In some embodiments head position is reported to the server supplying content to the playback device as indicated in step 2430. However, in other embodiments the head position information is not reported but used by the playback system to determine which broadcast or multicast content stream to receive and/or to determine what portion of the 3D environment is to be displayed to the user on the display device at a given time.

Operation proceeds from step 2428 or step 2430 (when implemented) to step 2432. In step 2432 the playback device receives images, e.g., one or more content streams. The content streams received, e.g., from a content server, communicate images corresponding to one or more fields of view. In one embodiment in step 2432, a first encoded image including image content captured by the first camera, e.g., the left eye camera, of the forward looking stereoscopic pair is received along with a second image captured by the second (right) camera of the first stereoscopic pair. In such an embodiment in step 2432 a second encoded image including content captured by the second camera, e.g., right eye camera, of the first stereoscopic camera pair is also received. The receipt of content streams may be the result of the playback device requesting particular content streams and receiving content via unicast delivery or as the result of the playback device receiving a multicast or broadcast of one or more streams providing images corresponding to an event such as a sports game at an arena or other 3D environment.

Operation proceeds from step 2432 to step 2434. In step 2434 which is implemented in some but not necessarily all embodiments, the playback device received information indicating which set or sets of mesh correction information such be used with respect to images that are being supplied to the playback device. The mesh correction indication information may take the form of a command or instruction to use as particular set of mesh correction information when using an identified set of images during rendering or an indication as to which camera captured images being supplied sot that the playback device can identify and use the set of mesh correction information corresponding to the camera which is the source of the images being received.

Operation proceeds from step 2434 to step 2436 in which received images are decoded. Thus, in the case where a first encoded image from a first camera was received, the first encoded image will be decoded in step 2436 to generate a first decoded image. As should be appreciated in the case of stereoscopic image content, left and right eye images may be received and decoded for each stereoscopic frame. Thus in step 2436 a right eye image, e.g., a second image from the second camera of the first stereoscopic pair is decoded as well. The decoded images are stored in step 2438 for use as textures to be applied to a surface of the 3D environmental model.

Operation proceeds from step 2438 to step 2440 in which a determination is made as to which decoded images and correction map information to use in rendering left and right eye images, e.g., corresponding to the user's field of view as indicated by the user's detected head position. Normally the images corresponding to the same time will be used in the rendering but in cases where images corresponding to different fields of view are received at different times, an older version, e.g., the last received version, of a frame corresponding to a portion of the overall 3D model may be used in combination with a more recently received frame in the user's main field of view so that a complete image can be rendered.

Left and right eye images are rendered separately in some embodiments even though they may then be displayed to the user together as a stereoscopic frame pair with the user's left eye seeing the rendered left eye image and the user's right eye seeing the rendered right eye image. In step 2442, a call is made to the rendering routine, e.g., shown in FIG. 25, to render the left eye image.

As part of rendering the left eye image, in step 2508 a rendering image may perform a rendering operation using first mesh correction information, the first decoded image, e.g., a forward left eye image, and an environmental mesh model to generate a first image for display, e.g., as a left eye image. In addition a first mask maybe used to determine how portions of said first image are combined with portions of another image corresponding to a different field of view as part of said first rendering operation. For example, wherein images obtained from different cameras overlap, the mask may be used to prevent one or more portions of an overlapping image from contributing to the image being generated by applying portions of said first image to a surface of the environmental mesh module as part of the rendering operation. An alpha value of zero may be assigned and used for the portion of the image which is not to be applied to the mesh thereby rendering its contribution zero.

To render the right eye image of a stereoscopic image pair being rendered, in step 2444 a call is made to the rendering routine to render the right eye image. Thus in step 2444 a second rendering operation is performed using a second set of mesh correction information, the second decoded image and the environmental mesh module to generate a second image for display. The same mask used for the left eye image of a field of view can be used during rendering for the right eye view corresponding to the same field of view. Thus, in some embodiments the first mask used for rendering the left eye image is used to determine how portions of said second image are combined with portions of a second image corresponding to a different, e.g., overlapping, field of view as part of the second rendering operation used render the right eye image.

Figure 25:
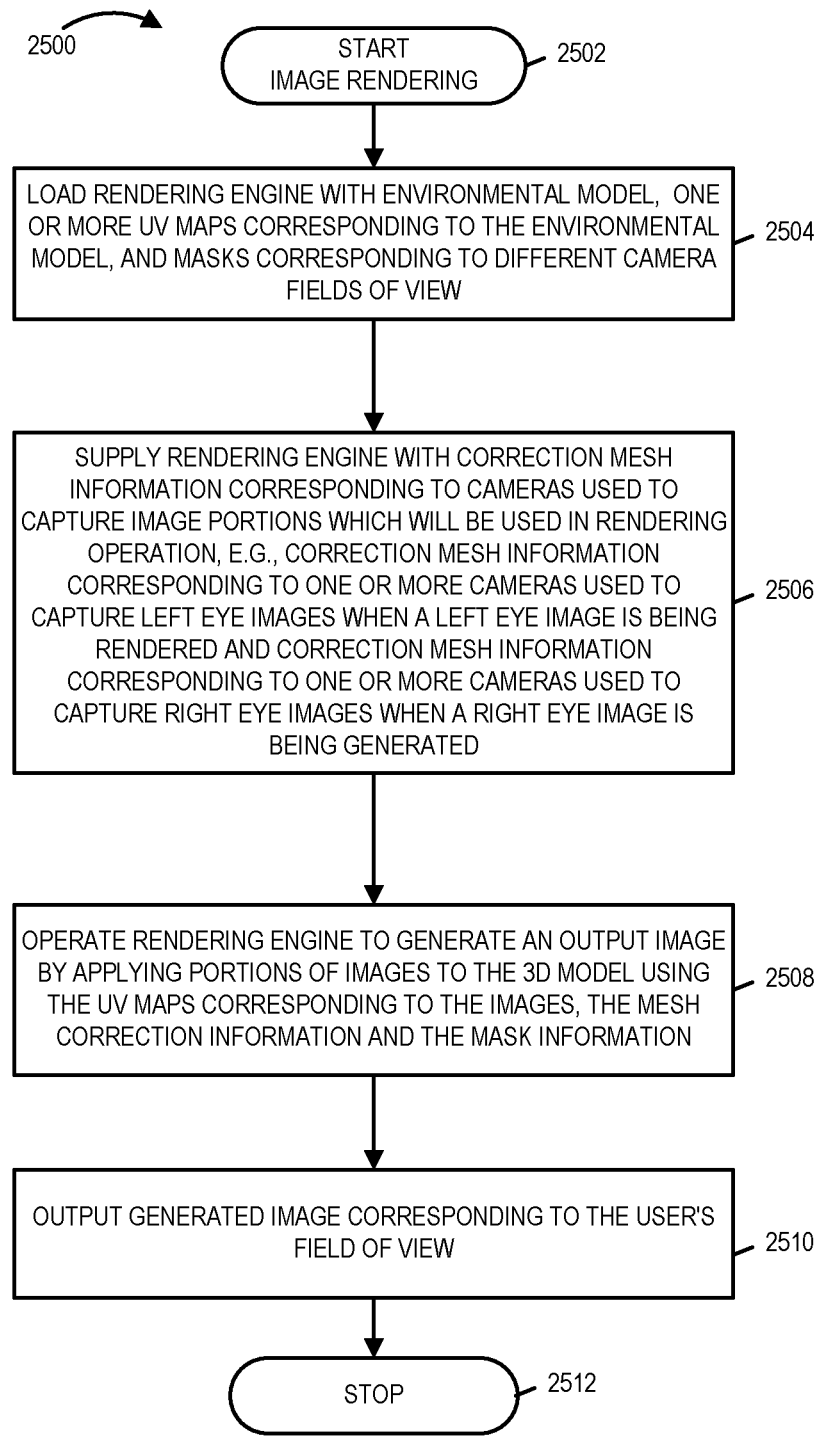
FIG. 25 is flowchart illustrating the steps of an image rendering subroutine which maybe implemented as part of the exemplary content playback method in some embodiments.

As should be appreciated, over time the steps in FIGS. 24 and 25 will be repeated several times. Later iterations may involve use of images from different cameras, e.g. a fourth and fifth camera corresponding to a different stereoscopic camera pair which may be on the same or different camera rig as the first stereoscopic pair. Thus, when step 2444 is performed for a second or later time, it may and sometimes does involve suing mesh correction information corresponding to a fourth camera when rendering an image corresponding to the fourth camera, where said fourth camera maybe and sometimes is one of a plurality of different cameras for which correction mesh information is received.

Then, in step 2446 the left and right eye images are displayed to a user using a display which results in the user's left eye seeing the left eye image and the user's right eye seeing the right eye image.

Operation proceeds from step 2446 to step 2428 so that additional images can be received and processed with the user being provided with stereoscopic images on an ongoing basis, e.g., for the duration of an event.

The image rendering routine 2500 shown in FIG. 25 will now be discussed. The routine maybe called to render left eye images and right eye images. A pair of rendered left and right eye images represents a stereoscopic frame which, when viewed by the user, will convey a sense of depth due to the user seeing different left and right eye images.

The rendering routine 2500 starts in step 2502 when called to render an image, e.g., by routine 2400. In step 2504 the rendering engine, e.g., rendering engine 822, is loaded with the environmental model, e.g., the 3D mesh model which comprise multiple mesh models corresponding to different fields of view, UV maps corresponding to different fields of view and masks corresponding to the different fields of view. The information loaded into the render can be easily understood in the context of FIG. 14 which shows the various pieces of information with the exception of the UV maps. As discussed above this information may be used for rending both the left and right eye images and may not depend on distortions which are specific to an individual camera lens of a pair of stereoscopic cameras.

With the environmental model and UV maps loaded, operation proceeds to step 2506. In step 2506 the rendering engine is supplied with environmental mesh correction information which is camera dependent. Thus in step 2506 the rendering engine is supplied with correction mesh information corresponding to the cameras used to capture image portions which will be used in the rendering operation. For example, if a left eye image is to be rendered, in step 2506 the rendering engine will receive mesh correction information corresponding to the cameras which captured the left eye image portions of the environment. Similarly if a right eye image is to be rendered, in step 2506 the rendering engine will receive mesh correction information corresponding to the cameras which captured the right eye image portions of the environment. If a single camera was used for a particular filed of view, the distortion correction mesh corresponding to the single camera will be used for rendering both the left and right eye views.

In some embodiments step 2506 includes determining which mesh correction information to use when performing a rendering operation based on which camera captured image content being used in the rendering operation or an indication from a server indication which mesh correction information should be used when rendering images corresponding to a received content stream.

Once the images corresponding to the different portions of the 3D model are loaded, in step 2508 the rendering engine is operated to generate an output image by applying portion of images to a surface of the 3D model based on the UV map information as corrected by the mesh correction information included in the received sets of mesh correction information. For example, a location of a vertex, e.g., node, in the UV map may be adjusted in accordance with received correction information before it is used to wrap the texture onto the surface of the 3D environmental model as part of the rendering process. During rendering the received masks are used to determine which portions of the received images will be used in the wrapping operation. Rendering engines such as those used in gaming systems can be used to implement the rendering based on the described inputs and correction information.

The rendering operation performed in step 2508 produces a left or right eye output image corresponding to the user's indicated field of view depending on whether left or right eye images are wrapped onto the surface of the 3D model of the environment with the rendering operation being performed for each of the left and right eye images of a stereoscopic image pair which is to be generated.

The image generated in step 2508 is output in step 2510 for display. While step 2512 is indicated as a stop step this merely indicates that rendering of an image is complete and it should be appreciated that the rendering routine 2500 can be called multiple times to render left and right eye images as needed, e.g., one image at a time.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A method of providing stereoscopic content, the method comprising:
    storing, in a content delivery system,
        i) first stereoscopic camera pair correction information corresponding to a first stereoscopic camera pair, said correction information corresponding to the first stereoscopic camera pair including:
            first correction information for a first camera of the first stereoscopic camera pair, said first correction information being first camera dependent mesh correction information, indicating corrections to be made to node positions in a UV map when rendering an image captured by said first camera; and second correction information for a second camera of the first stereoscopic camera pair, said second correction information being second camera dependent mesh correction information, indicating corrections to be made to node positions in the UV map when rendering an image captured by said second camera;
        ii) second stereoscopic camera pair correction information corresponding to a second stereoscopic camera pair, said second stereoscopic camera pair including a third camera and a fourth camera, said correction information corresponding to the second stereoscopic camera pair including third correction information for images captured by the third camera and fourth correction information for images captured by the fourth camera; and iii) said UV map;

operating the content delivery system to provide said UV map, said first correction information corresponding to the first stereoscopic camera pair and said second correction information corresponding to the second stereoscopic camera pair to a playback device prior to detecting a network controlled switch from streaming content from the first stereoscopic camera pair to streaming content corresponding to the second stereoscopic camera pair;

detecting a network controlled switch from streaming content from the first stereoscopic camera pair to streaming content second stereoscopic pair; and in response to detecting the network controlled switch from streaming content from said first stereoscopic camera pair to said second stereoscopic pair, operating the content delivery system to indicate to the playback device that the second stereoscopic camera pair correction information should be used for rendering operations.

2. The method of claim 1, wherein said first stereoscopic camera pair corresponds to a first direction, the method further comprising:

operating said content delivery system to transmit a stereoscopic content stream including encoded images generated from image content captured by said first and second cameras.

3. The method of claim 2, further comprising:

transmitting to said playback device an environmental mesh model to be used in rendering image content using said UV map.

4. The method of claim 3, wherein said first camera of the first stereoscopic camera pair captures left eye images and said second camera of the first stereoscopic camera pair captures right eye images;

wherein said first correction information includes information generated based on measurement of one or more optical characteristics of a first lens of said first camera of the first stereoscopic camera pair; and wherein said second correction information includes information generated based on measurement of one or more optical characteristic of a second lens of said second camera of the first stereoscopic camera pair.

5. The method of claim 4 wherein said UV map maps portions of images captured by said first stereoscopic camera pair to a portion of said environmental mesh model as part of an image rendering operation.

6. The method of claim 5, wherein the first correction information includes information identifying a subset of nodes in the UV map and provides node position correction information for the subset of nodes for which corrections are to be performed, said subset of nodes being less than all the nodes in the UV map.

7. The method of claim 6, wherein the second correction information includes information identifying a subset of nodes in the UV map and provides node position correction information for the subset of nodes for which corrections are to be performed, said subset of nodes being less than all the nodes in the UV map.

8. The method of claim 2, wherein said stereoscopic content stream communicates encoded image content including encoded left and right eye images captured by said first and second cameras of said first stereoscopic camera pair.

9. The method of claim 8, further comprising:

operating the content delivery system to provide third correction mesh information and fourth correction mesh information to the playback device, said third correction mesh information being for use in rendering image content captured by a first camera of a second stereoscopic camera pair, said fourth correction mesh information being for use in rendering image content captured by a second camera of the second stereoscopic camera pair.

10. The method of claim 9, wherein said first and second stereoscopic camera pairs correspond to a forward viewing direction but different locations at an area or event location where content is being captured for streaming.

11. The method of claim 9, further comprising:

indicating to the playback device that said third and fourth correction mesh information should be used when content captured by said second camera pair is streamed to the playback device instead of content from said first camera pair.

12. The method of claim 11, wherein said step of indicating to the playback device that said third and fourth correction mesh information should be used is performed in response to: a user control change from receiving a first content stream including content from said first stereoscopic camera pair to receiving a second content stream including encoded content from the second stereoscopic camera pair.

13. The method of claim 12, further comprising:

storing fifth correction mesh information for a first camera of a third stereoscopic camera pair;

storing sixth correction mesh information for a second camera of the third stereoscopic camera pair; and operating the content delivery system to provide said fifth and sixth correction mesh information to the playback device, said fifth correction mesh information being for use in rendering image content captured by said first camera of said third stereoscopic camera pair, said sixth correction mesh information being for use in rendering image content captured by said second camera of the third stereoscopic camera pair.

14. A content delivery system, comprising:

a memory including:

i) first stereoscopic camera pair correction information corresponding to a first stereoscopic camera pair, said correction information corresponding to the first stereoscopic camera pair including:

first correction information for a first camera of the first stereoscopic camera pair, said first correction information being first camera dependent mesh correction information, indicating corrections to be made to node positions in a UV map when rendering an image captured by said first camera; and second correction information for a second camera of the first stereoscopic camera pair, said second correction information being second camera dependent mesh correction information, indicating corrections to be made to node positions in the UV map when rendering an image captured by said second camera;

ii) second stereoscopic camera pair correction information corresponding to a second stereoscopic camera pair, said second stereoscopic camera pair including a third camera and a fourth camera, said correction information corresponding to the second stereoscopic camera pair including third correction information for images captured by the third camera and fourth correction information for images captured by the fourth camera; and iii) said UV map; and a processor configured to:

control said system to provide, to a playback device, said UV map, said first correction information corresponding to the first stereoscopic camera pair and said second correction information corresponding to the second stereoscopic camera pair, prior to detecting a network controlled switch from streaming content from the first stereoscopic camera pair to streaming content corresponding to the second stereoscopic camera pair;

detect a network controlled switch from streaming content from the first stereoscopic camera pair to streaming content corresponding to second stereoscopic pair; and indicate, in response to detecting the network controlled switch from streaming content from said first stereoscopic camera pair to said streaming content corresponding to second stereoscopic pair, to the playback device that the second stereoscopic camera pair correction information should be used for rendering operations.

15. The content delivery system of claim 14, wherein said first stereoscopic camera pair corresponds to a first direction;

wherein said processor is further configured to control said system to transmit a stereoscopic content stream including encoded images generated from image content captured by said first and second cameras; and wherein said processor is further configured to transmit to said playback device an environmental mesh model to be used in rendering image content.

16. The content delivery system of claim 15, wherein said first camera of the first stereoscopic camera pair captures left eye images and said second camera of the first stereoscopic camera pair captures right eye images;

wherein said first correction information includes information generated based on measurement of one or more optical characteristics of a first lens of said first camera of the first stereoscopic camera pair; and wherein said second correction information includes information generated based on measurement of one or more optical characteristic of a second lens of said second camera of the first stereoscopic camera pair.

17. The content delivery system of claim 16, wherein said processor is further configured to transmit to said playback device a first UV map to be used for mapping portions of images captured by said first stereoscopic camera pair to a portion of said environmental mesh model as part of an image rendering operation.

18. The content delivery system of claim 14, wherein said processor is further configured to control said system to provide third correction mesh information and fourth correction mesh information to the playback device, said third correction mesh information being for use in rendering image content captured by a first camera of a second stereoscopic camera pair, said fourth correction mesh information being for use in rendering image content captured by a second camera of the second stereoscopic camera pair.

19. The content delivery system of claim 18, wherein said processor is configured to indicate to the playback device that said third and fourth correction mesh information should be in response to said system detecting: i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

20. A non-transitory computer readable medium including processor executable instructions which when executed by a processor control a content delivery system to:

store, in the content delivery system, i) first stereoscopic camera pair correction information corresponding to a first stereoscopic camera pair, said correction information corresponding to the first stereoscopic camera pair including:

first correction information for a first camera of the first stereoscopic camera pair, said first correction information being first camera dependent mesh correction information, indicating corrections to be made to node positions in a UV map when rendering an image captured by said first camera; and second correction information for a second camera of the first stereoscopic camera pair, said second correction information being second camera dependent mesh correction information, indicating corrections to be made to node positions in the UV map when rendering an image captured by said second camera;

ii) second stereoscopic camera pair correction information corresponding to a second stereoscopic camera pair, said second stereoscopic camera pair including a third camera and a fourth camera, said correction information corresponding to the second stereoscopic camera pair including third correction information for images captured by the third camera and fourth correction information for images captured by the fourth camera; and iii) said UV map;

provide said UV map, said first correction information corresponding to the first stereoscopic camera pair and said second correction information corresponding to the second stereoscopic camera pair to a playback device prior to detecting a network controlled switch from streaming content from the first stereoscopic camera pair to streaming content corresponding to the second stereoscopic camera pair;

detect a network controlled switch from streaming content from the first stereoscopic camera pair to streaming content corresponding to the second stereoscopic pair; and indicate, in response to detecting the network controlled switch from streaming content from said first stereoscopic camera pair to streaming content corresponding to the said second stereoscopic pair, to the playback device that the second stereoscopic camera pair correction information should be used for rendering operations.

* * * * *